US011956137B1

United States Patent
Turgut et al.

(10) Patent No.: US 11,956,137 B1
(45) Date of Patent: *Apr. 9, 2024

(54) ANALYZING SERVERS BASED ON DATA STREAMS GENERATED BY INSTRUMENTED SOFTWARE EXECUTING ON THE SERVERS

(71) Applicant: Splunk Inc., San Francisco, CA (US)

(72) Inventors: Ozan Turgut, San Mateo, CA (US); Joseph Ari Ross, Redwood City, CA (US); Eyal Ophir, Mountain View, CA (US); Calvin Chan, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,519

(22) Filed: Jun. 6, 2022

Related U.S. Application Data

(63) Continuation of application No. 16/990,923, filed on Aug. 11, 2020, now Pat. No. 11,381,492, which is a
(Continued)

(51) Int. Cl.
*H04L 43/00* (2022.01)
*G06F 11/30* (2006.01)
(Continued)

(52) U.S. Cl.
CPC .......... *H04L 43/14* (2013.01); *G06F 11/3006* (2013.01); *G06F 11/302* (2013.01);
(Continued)

(58) Field of Classification Search
CPC ......... H04L 43/00; H04L 43/14; H04L 43/16; H04L 43/0817; H04L 43/0876;
(Continued)

(56) References Cited

U.S. PATENT DOCUMENTS 7,379,999 B1 * 5/2008 Zhou ................... G06F 11/3495
709/224
7,694,303 B2 * 4/2010 Hahn .................. G06F 9/44505
714/6.32

(Continued)

OTHER PUBLICATIONS

Splunk Enterprise 8.0.0 Overview, available online, retrieved May 20, 2020 from docs.splunk.com.
(Continued)

*Primary Examiner* — James N Fiorillo
(74) *Attorney, Agent, or Firm* — McDermott Will & Emery LLP

(57) ABSTRACT

An instrumentation analysis system processes data streams received from servers executing instrumented software. The system determines a set of servers that satisfy a given criteria, for example, a set of servers with high resource utilization. The set of servers may be determined by the system based on triggers or specified by a user. The system analyzes properties of servers to determine a property that characterizes the set of servers. The property characterizing the servers is provided to users via a user interface or alerts for further analysis, for example, to analyze the cause of high resource utilization.

20 Claims, 17 Drawing Sheets

Related U.S. Application Data continuation of application No. 15/699,451, filed on Sep. 8, 2017, now Pat. No. 10,749,782.

(60) Provisional application No. 62/393,012, filed on Sep. 10, 2016.

(51) Int. Cl.
    *G06F 11/34* (2006.01)
    *G06F 11/36* (2006.01)
    *H04L 41/0686* (2022.01)
    *H04L 43/0817* (2022.01)
    *H04L 43/0876* (2022.01)
    *H04L 43/16* (2022.01)

(52) U.S. Cl.
    CPC ...... *G06F 11/3404* (2013.01); *G06F 11/3409* (2013.01); *G06F 11/3612* (2013.01); *G06F 11/3644* (2013.01); *H04L 41/0686* (2013.01); *H04L 43/0817* (2013.01); *H04L 43/16* (2013.01); *G06F 11/3452* (2013.01); *G06F 2201/81* (2013.01); *H04L 43/0876* (2013.01)

(58) Field of Classification Search
    CPC .. H04L 63/1408; H04L 41/0686; G06F 11/30; G06F 11/34; G06F 11/36; G06F 11/302; G06F 11/3006; G06F 11/3404; G06F 11/3409; G06F 11/3452; G06F 11/3612; G06F 11/3644; G06F 11/3466; G06F 9/46; G06F 9/50; G06F 2201/81
    USPC ...................................................... 709/224
    See application file for complete search history.

(56) References Cited

U.S. PATENT DOCUMENTS

| | | | | |
|---|---|---|---|---|
| 7,970,902 B2* | 6/2011 | Rolia | ....... | H04L 67/30 709/226 |
| 8,255,541 B2* | 8/2012 | Reisman | ....... | G06F 16/951 709/227 |
| 8,490,064 B2* | 7/2013 | Shrivastava | ....... | G06F 11/079 717/130 |
| 8,676,530 B2* | 3/2014 | Roth | ....... | H04L 43/50 702/182 |
| 9,892,020 B1* | 2/2018 | Ophir | ....... | G06F 16/24578 |
| 10,243,819 B1* | 3/2019 | Chheda | ....... | H04L 41/22 |
| 2004/0024900 A1* | 2/2004 | Breiter | ....... | H04N 7/17336 709/225 |
| 2005/0240668 A1* | 10/2005 | Rolia | ....... | H04L 67/62 709/226 |
| 2006/0190615 A1* | 8/2006 | Panwar | ....... | H04L 67/104 375/E7.011 |
| 2007/0180096 A1* | 8/2007 | Roth | ....... | H04L 43/55 714/E11.207 |
| 2007/0198679 A1* | 8/2007 | Duyanovich | ....... | G06F 11/3409 709/223 |
| 2007/0234309 A1* | 10/2007 | Davia | ....... | G06F 11/3676 717/130 |
| 2008/0270526 A1* | 10/2008 | Barnett | ....... | H04L 67/10 709/203 |
| 2009/0157834 A1* | 6/2009 | Krishnaswamy | .. | G06Q 30/0226 709/206 |
| 2010/0150004 A1* | 6/2010 | Duffield | ....... | H04L 41/0681 370/252 |
| 2011/0283264 A1* | 11/2011 | Gagliardi | ....... | G06F 11/3644 717/130 |
| 2013/0110754 A1* | 5/2013 | Ravindra | ....... | G06Q 30/02 706/46 |
| 2013/0346807 A1* | 12/2013 | Howard | ....... | G06F 11/3419 714/47.2 |
| 2014/0122698 A1* | 5/2014 | Batrouni | ....... | H04L 41/0896 709/224 |
| 2014/0195686 A1* | 7/2014 | Yeager | ....... | H04L 67/568 709/226 |
| 2014/0204794 A1* | 7/2014 | El-Najjar | ....... | H04W 40/248 370/254 |
| 2014/0279762 A1* | 9/2014 | Xaypanya | ....... | H04L 63/145 706/12 |
| 2015/0088968 A1* | 3/2015 | Wei | ....... | G06F 9/54 709/203 |
| 2015/0199224 A1* | 7/2015 | Mihnev | ....... | G06F 11/0751 714/37 |
| 2015/0263985 A1* | 9/2015 | Schmitter | ....... | H04L 45/123 709/226 |
| 2016/0062876 A1* | 3/2016 | Narayanan | ....... | G06N 5/022 717/124 |
| 2016/0170469 A1* | 6/2016 | Sehgal | ....... | G06F 1/3206 713/320 |
| 2016/0294646 A1* | 10/2016 | Kirner | ....... | H04L 41/0893 |
| 2016/0337480 A1* | 11/2016 | Anerousis | ....... | H04L 12/40 |
| 2016/0357610 A1* | 12/2016 | Bartfai-Walcott | .... | G06F 9/5027 |
| 2017/0034019 A1* | 2/2017 | Nataraj | ....... | G06F 11/3006 |
| 2017/0034023 A1* | 2/2017 | Nickolov | ....... | H04L 43/0817 |
| 2017/0034192 A1* | 2/2017 | Schulman | ....... | H04L 63/1416 |
| 2017/0187791 A1* | 6/2017 | Bayon-Molino | ... | H04L 41/0806 |
| 2017/0235848 A1* | 8/2017 | Van Dusen | ....... | G06Q 30/0201 705/12 |
| 2017/0316483 A1* | 11/2017 | Lester | ....... | G06Q 30/0641 |
| 2017/0317950 A1* | 11/2017 | Revach | ....... | H04L 43/16 |
| 2018/0004497 A1* | 1/2018 | Ramachandran | ... | G06F 11/3419 |
| 2018/0034903 A1* | 2/2018 | Ananthapadmanabh | ....... | H04L 67/1008 |
| 2018/0060325 A1* | 3/2018 | Taylor | ....... | G06F 16/24578 |
| 2018/0077044 A1* | 3/2018 | Turgut | ....... | G06F 11/3404 |
| 2018/0115574 A1* | 4/2018 | Ridley | ....... | H04L 43/50 |
| 2019/0095478 A1* | 3/2019 | Tankersley | ....... | G06F 11/3006 |
| 2019/0236448 A1* | 8/2019 | Piatt | ....... | G06N 3/08 |
| 2022/0309037 A1* | 9/2022 | Gutierrez | ....... | G06F 16/93 |
| 2023/0261932 A1* | 8/2023 | Seetharaman | ....... | H04L 41/40 709/223 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

* cited by examiner

ANALYZING SERVERS BASED ON DATA STREAMS GENERATED BY INSTRUMENTED SOFTWARE EXECUTING ON THE SERVERS

CROSS REFERENCE TO RELATED APPLICATIONS

This present application claims the benefit of priority under 35 U.S.C. § 120 as a continuation of U.S. patent application Ser. No. 16/990,923, filed Aug. 11, 2020, now allowed, which is a continuation of U.S. Pat. No. 10,749,782, issued Aug. 18, 2020, which claims the benefit of U.S. Provisional Application No. 62/393,012, filed on Sep. 10, 2016, the disclosures of which are hereby incorporated by reference in their entirety for all purposes.

BACKGROUND

This disclosure relates to analysis of instrumented software systems in general and more specifically to determining characteristics of servers based on data streams received from instrumented software executing on servers.

Software developers monitor different aspects of software they develop by instrumenting the code. These include performance of the software, errors encountered during execution of the software, significant events encountered during execution of the software, information describing which parts of code are being executed and which parts are not being executed, and so on. Instrumentation of software executing in large enterprises results in generation of large amounts of data. Analysis of this data is typically performed by experts and can take significant amount of time. For example, if a problem occurs in one or more servers, analysis of the data to identify the problem can take days or weeks. Conventional techniques are often unable to process the data received from the instrumented software in reasonable time to be able to detect problems in systems executing the software to be able to take fast and appropriate action. Furthermore, conventional techniques often do not provide high level information that identifies problems with systems executing the software and information useful for taking appropriate action for addressing a problem identified.

SUMMARY

Embodiments of an instrumentation analysis system analyze servers providing data streams generated by instrumented software executing on the servers. The instrumentation analysis system stores values of attributes describing the servers. An attribute of a server may represent data received as a data stream from the server. For example, an attribute may represent resource utilization of a server, for example, memory utilization, CPU (central processing unit) utilization, disk utilization, or utilization of any other resource. An attribute may represent metadata describing the server specified independent of the data streams. For example, the attribute may store information describing a data center associated with the server, a group of user accounts associated with the server, and so on. The instrumentation analysis system receives a filtering criterion based on an attribute representing resource utilization of servers. For example, the filtering criterion may identify servers having excessive memory utilization or servers having low CPU utilization. The instrumentation analysis system identifies a filtered set of servers satisfying the filtering criterion. The instrumentation analysis system selects a plurality of properties of the filtered set of servers. The instrumentation analysis system determines a score for each selected property. The score represents a measure indicative of a strength by which the property distinguishes servers of the filtered set from remaining servers. In an embodiment, the score is determined based on a comparison of the likelihood that a server from the filtered set has the property with the likelihood that a server outside the filtered set has the property. The instrumentation analysis identifies a characteristics property based on the score. The characteristic property distinguishes the filtered set of servers from the remaining servers. The instrumentation analysis system reports the identified property, for example, by sending an alert to a user account or providing information describing the characteristic property via a user interface.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
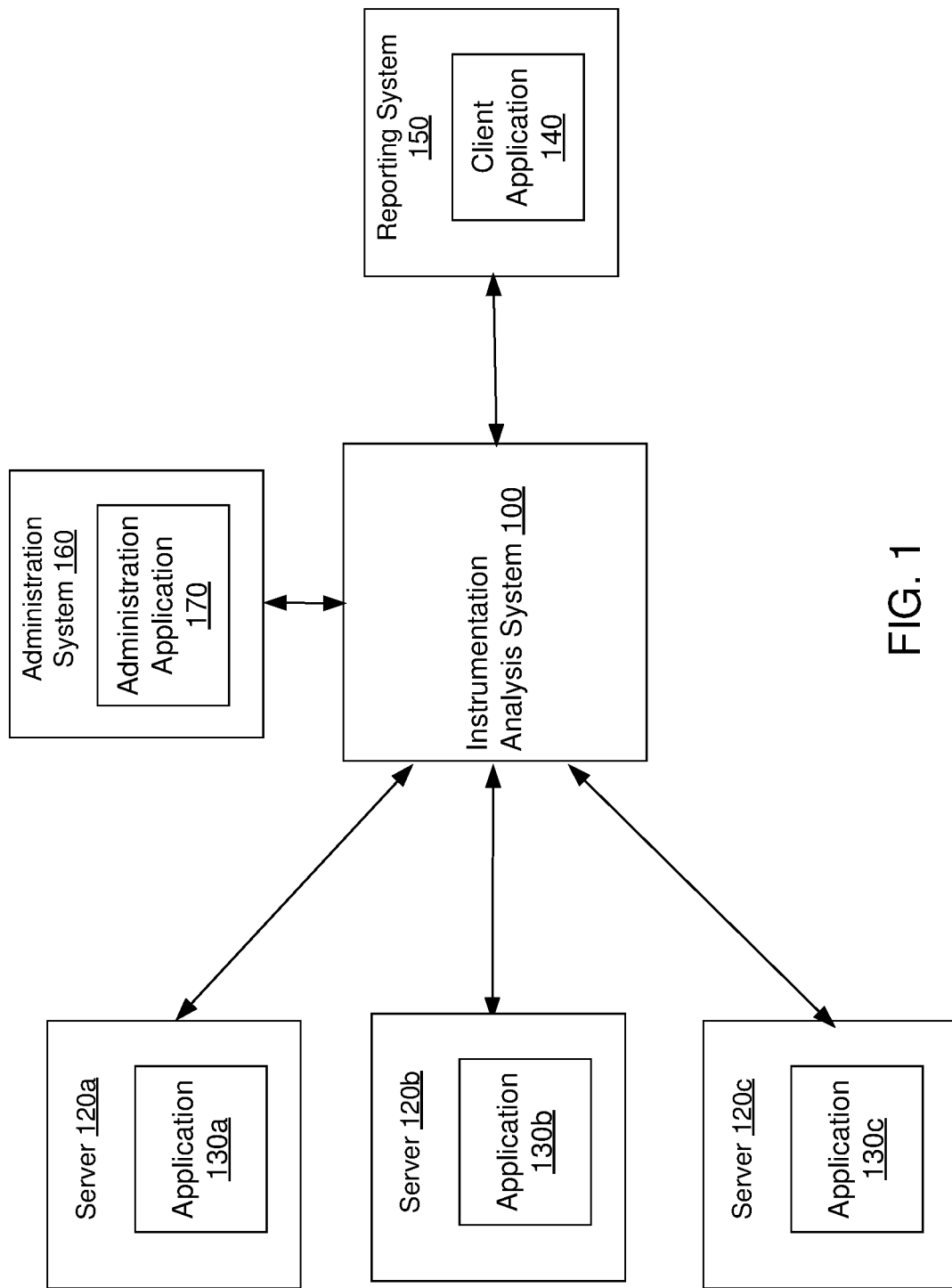
FIG. 1 shows the overall system environment for analyzing servers based on data streams generated by instrumented software executing on the servers, according to an embodiment.

FIG. 1 shows the overall system environment for analyzing servers based on data streams generated by instrumented software executing on the servers, according to an embodiment. The overall system environment includes an instrumentation analysis system 100, one or more servers 120 (a server is also referred to as a host or a server), an administration system 160, and a reporting system 150. In other embodiments, more or fewer components than those indicated in FIG. 1 may be used. For example, server 120, administration system 160, and reporting system 150 may interact with instrumentation analysis system 100 via a network (not shown in FIG. 1). Furthermore, there may be more or fewer instances of each system shown in FIG. 1, for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130b" in the figures).

The instrumentation analysis system 100 receives data comprising values of metrics sent by different servers 120 (the instrumentation analysis system 100 may also be referred to herein as an analysis system or a data analysis system). A server 120 executes instrumented software, for example, application 130 (a development system 120 is also referred to herein as an external system or a source of data streams.) Although, application 130 is shown in FIG. 1 as an example of instrumented software, the techniques disclosed herein are not limited to application software but are applicable to other kinds of software, for example, server software, software executing on client devices, websites, and so on. A server 120 comprises any computing system that is configured to execute instrumented software, whether or not it is used for development purposes. For example, the server 120 may be a computing system used for testing purposes, staging purposes, or any production system executing in an enterprise. A server 120 may also be referred to herein as a server or a host. A server may represent a computer that is executing software or a process executing a software.

The software executing on a server 120 is configured to send information to instrumentation analysis system 100 generated as a result of instrumenting the software. For example, the application 130 may send values corresponding to various metrics determined periodically to instrumentation analysis system 100. Different applications 130 may send the same set of metric or different metrics. Two different instances of an application may send the same metric (of different metrics) at different rates. The same application may send the metric at different rates at different points in time. The application 130 sends data to the instrumentation analysis system 100 by invoking application programming interface (API) supported by the instrumentation analysis system 100.

The application 130 (or any software) may be instrumented to add counters or gauges to the application. A counter comprises instructions that store a value that is incremented upon occurrence of certain event in the software. The counter may be used to determine the number of times a particular part of the code representing instructions of the software is executed, for example, a function or a method, a particular branch of a conditional code, an exception, a loop, and so on.

Typically a counter value changes monotonically, for example, a counter value may increase monotonically. Values of a counter may be compared to determine the change in the particular counter value at two different points in time. For example, the number of times a particular event occurs within a time interval between times t1 and t2 may be determined by computing the change in a corresponding counter value from t1 to t2. The APIs of the instrumentation analysis system may be invoked by the application 130 to send the current value of the counter to the instrumentation analysis system 100.

Following is an example of instrumented code of an application 130. The following instruction included in the code being instrumented creates a counter object for tracking count of an action or entities.

counter1=createCounter(source="web1", metric="metric1");

The above instruction creates a counter object and assigns it to the variable counter1. The counter object is associated with a source "web1" and metric "metric1." In an embodiment, the source and the metric values uniquely identify the data stream associated with the counter (or a gauge). In other embodiments, more or fewer key value pairs may be used to uniquely identify a data stream.

One or more of the values specified during creation of a counter are received when data corresponding to the counter is sent by the instrumented code to the instrumentation analysis system 100. Embodiments allow the application 130 to be instrumented to reduce the amount of information sent with each data stream. This reduces the amount of overhead introduced in the application 130 as a result of instrumenting the code.

The instrumented code of application 130 may include instructions to update the counter value at various places in the code. For example, the counter counter1 may be incremented by executing the instruction "counter1.increment( )." The counter may be incremented to track various actions or entities associated with the code. For example, the counter may be incremented whenever a particular function or method is called, the counter may be incremented whenever a particular branch of a conditional expression is executed, the counter may be incremented whenever an object of a particular type is created, for example, in a constructor of an object. The increment instruction of the counter may be called conditionally, for example, if a function is invoked with a particular combination of parameters. The application 130 communicates the counter value to the instrumentation analysis system 100 by invoking an API of the instrumentation analysis system 100.

A gauge comprises instructions to measure certain runtime characteristics of the application 130, for example, heap size, number of cache misses or hits, active memory used, CPU (central processing unit) utilization, total time taken to respond to a request, time taken to connect to a service, and so on. Metrics reported by an instrumented software may describe resource utilization of the server executing the software, for example, memory utilization, CPU utilization, disk utilization, and so on. A gauge may also be used to track certain application specific parameters or business related values, for example, number of transactions, number of users, and so on. The gauge may be invoked periodically based on an interval that is configurable. The value of the gauge is sent to instrumentation analysis system 100 periodically.

The administration system 160 allows a privileged user, for example, a system administrator to associate data streams with metadata. The administration system 160 comprises the administration application 170 that provides a user interface for a system administrator to specify the metadata. The metadata comprises attributes describing the servers. In an embodiment, the metadata is represented as properties, for example, name-value pairs. The instrumentation analysis system 100 receives metadata describing data streams and stores the metadata. The ability to specify metadata describing data streams independently from the data received from each data stream provides several benefits in generating reports based on the data stream.

The administration application 170 allows an administrator (or any user) to analyze servers monitored by the instrumentation analysis system 100. For example, the administration application 170 provides a user with visual representations of data describing servers sending data streams to the instrumentation analysis system 100. The administration application 170 allows users to specify filtering criteria to determine various subsets of the servers and to view characteristics of the subsets of servers. An administrator may modify execution of one or more servers based on the analysis. For example, one or more servers may be added to a data center to reduce the overall workload per server. As another example, processes executing on a server may be moved to other servers to optimize resource utilization of the servers.

The instrumentation analysis system 100 may receive new metadata or modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify applications 130. Examples of metadata that may be specified by a user include information identifying a data center associated with the server, an organization associated with the server, a group of users or user accounts associated with the server (for example, engineers working on a project), a project associated with the server, a location associated with the server, and so on.

Software developers instrument their software to generate raw data that can be combined in various ways in the generated report. Furthermore, persons that are experts at generating the instrumented software can be different from the software developers. For example, an expert at data analysis who is not a developer can define the metadata for the data streams and generate reports without being involved in the development process. This is significant because the skills required for analyzing data are typically different from the skills required for developing software.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of application 130.

Furthermore, the instrumentation analysis system 100 provides separation of the metadata describing the data streams from the data of the data streams. Accordingly, the amount of data that needs to be transmitted from the servers 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be a client device. The reporting system 150 includes a client application 140 that allows a user to interact with the instrumentation analysis system 100. In an embodiment, the client application 140 is an internet browser, which may include client side code (e.g., Java Script) for accessing the instrumentation analysis system 100. In other embodiments, client application 140 is a proprietary application developed for interacting with the instrumentation analysis system 100.

The reporting system 150 can be a conventional computer system (e.g., a desktop or laptop computer), a tablet, or a device having computer functionality such as a personal digital assistant (PDA), a mobile telephone, a smart phone or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage and input/output controller. The computing system used for hosting the instrumentation analysis system 100 is typically a server class system that uses powerful processors, large memory, and fast input/output systems compared to a typical computing system used, for example, as a reporting system 150.

In an embodiment, data from several servers 120 may be consolidated, for example, by a server and the combined data sent to the instrumentation analysis system 100. For example, an enterprise may install a server that receives data stream internally from different servers 120 and sends the combined data in a batch form to the instrumentation analysis system 100 periodically. This allows efficiency of external communication from the enterprise. However this configuration may result in delay in communicating information to the instrumentation analysis system 100 and the corresponding delay in reporting data by the reporting system 150.

Associating Dimensions with Data Streams

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are cpu (central processing unit) load, cache misses, cache hits, and so on. A value of a dimension is also referred to as a coordinate value of the data stream. A coordinate value may be represented as a metadata attribute stored in the metadata store 230. Given the two dimensions of source and metric, a data stream may be identified by providing the two coordinates representing the source and the metric, for example, (server1, cpu_load) or (server2, memory_usage).

A data stream may be characterized by multiple dimensions (i.e., more than the two dimensions described above, i.e., source and metric name.) For example, if each server has multiple cpus, a dimension cpu_id may be included. Accordingly, each data stream obtained from a system may be characterized by (source_id, cpu_id, metric_name), i.e., a source identifier, a cpu identifier, and a name for the metric. Examples of data streams identified using three coordinates include (server1, cpu1, load), (server1, cpu2, load), (server2, cpu1, load), (server2, cpu2, load) and so on.

As another example of a dimension, a system may define customer name as a dimension. The name of the customer may be reported by the instrumented software, for example, based on the configuration parameters of the instrumented software executing on a server 120. The customer name may be specified using a system property to the instrumented software. The instrumented software includes the customer name when it identifies a data stream associated with that particular customer. The ability to associate a data stream with a customer allows the instrumentation analysis system to perform customer specific analysis, for example, report on usages of systems for each customer, identify customers reporting more than a threshold number of errors and so on. The instrumentation analysis system may represent values for a dimension as properties. A property may be represented as a name value pair or as tuples.

A data stream may be obtained from instrumented software or may be generated as a result of execution of blocks of a data stream language program within the instrumentation analysis system. A data stream may also comprise data stored in the instrumentation analysis system, for example, in a data store (such as a time series data store 260 described herein.)

System Architecture of the Instrumentation Analysis System

Figure 2:
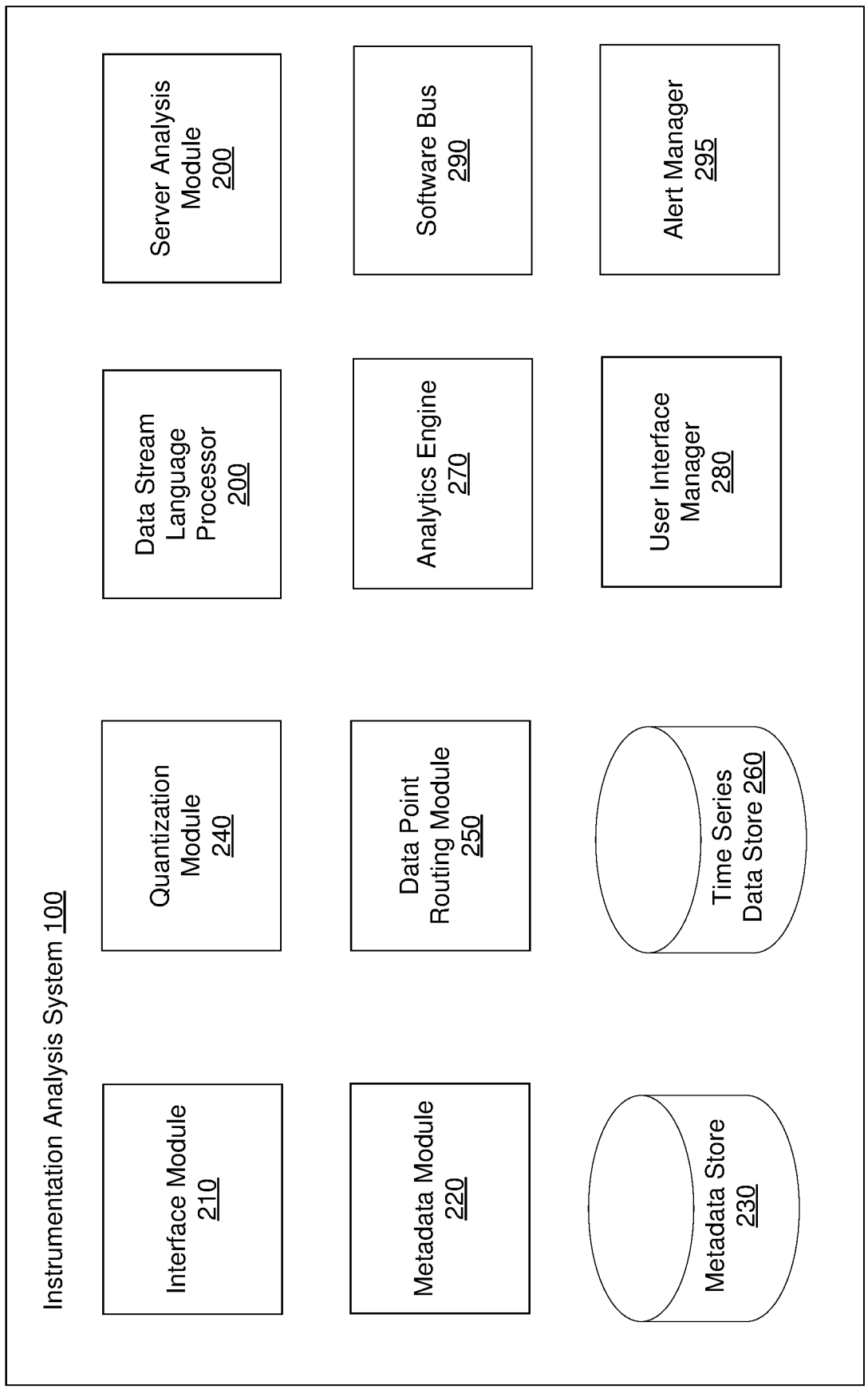
FIG. 2 shows the architecture of a system for executing a data stream language program for processing data streams received from instrumented software, according to an embodiment.

FIG. 2 shows the architecture of a system for executing a data stream language program for processing data streams received from instrumented software, according to an embodiment. The instrumentation analysis system 100 includes an interface module 210, a quantization module 240, metadata module 220, metadata index 230, a data point routing module 250, an analytics engine 270, a user interface manager 280, a data stream language processor 225, a server analysis module 200, a time series data store 260, software bus 290, and an alert manager 295. In other embodiments, the instrumentation analysis system 100 may include other modules not described herein. Functionality indicated as provided by a particular module may be implemented by other modules instead.

The interface module 210 receives requests from external systems, for example, servers 120 that communicate with the instrumentation analysis system 100. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams from one or more servers 120. In an embodiment, the interface module 210 receives data and represents it as tuples. A tuple of data received by the interface module 210 comprises various elements including a metric identifier, for example, a name of the metric corresponding to the tuple and a value of the metric. The tuple of data received may further comprise other elements, for example, a timestamp corresponding to the time that the data was captured by the application 130 sending the data, one or more properties associated with the data.

In an embodiment, the timestamp associated with a tuple represents the time that the data value was received by the instrumentation analysis system 100. The properties associated with the data may be provided in the form of name, value pairs. These properties provide additional information describing the data of the data streams received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname hi, all tuples with metric name m1 and hostname h1 are assigned the same time series identifier. Accordingly, the tsid uniquely identifies all tuples of a data stream received by the instrumentation analysis system 100.

The data of data streams received by the interface module 210 represents various types of data generated by instrumented software, for example, data representing resource utilization of a server executing the instrumented software. Examples of data streams comprising resource utilization include memory utilization, disk utilization, CPU (central processing unit) utilization, network utilization, cache utilization, and so on. A server may measure memory utilization by periodically determining the total memory used by various processes executing on the server and send the values as data points of the data stream. A server may determine CPU utilization of the server by periodically calculating the percentage of time that the CPU is busy during a time interval. A server may determine network utilization of a server by calculating the amount of data being transmitted from the server and/or received by the server during a time interval.

The quantization module 240 processes data values received so as to transform an input time series of data in which data is available at arbitrary time intervals to a time series in which data is available at regular time intervals. For example, the data values received in an input time series may occur at irregular interval, however, the quantization module 240 processes the data of the time series to generate a time series with data occurring periodically, such as every second, or every 5 seconds, or every 15 seconds, and so on. This process is referred to herein as quantization of the time series. In an embodiment, the interface module 210 creates multiple threads or processes, each thread or process configured to receive data corresponding to a data stream. Each thread or process invokes the quantization module 240 to perform quantization of the data received for each data stream for each time interval.

The metadata module 220 receives and stores metadata information describing various data streams received from the servers 120. In an embodiment, the metadata stored in the metadata module 220 is received from a user, for example, a system administrator interacting with the instrumentation analysis system 100 using the administration system 160.

The metadata may be represented as properties or name-value pairs. In an embodiment, the metadata is stored as metadata objects, each object defining a set of properties that may be represented as name-value pairs. A set of data streams may be associated with the metadata object. Accordingly, all properties represented by the metadata object are associated with each data stream that is associated with the metadata object.

The metadata datastore 230 stores the metadata objects and their associations with the data streams. The metadata datastore 230 stores an identifier (ID) for each metadata object and the properties represented by the metadata object. In an embodiment, each data stream is associated with a time series identifier that uniquely identifies the data stream. The metadata datastore 230 stores an index that maps each metadata object to a set of time series identifier values. The metadata store 230 may receive instructions to modify a metadata object. For example, the metadata store 230 may receive instructions to modify, add or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The user interface manager 280 renders the user interface for allowing users to specify the parameters of a data stream language program and to present results of execution of the data stream language program. The user interface manager 280 may display real-time results of a data stream language program as one or more charts that are periodically updated as the data of the data streams is received. The user interface manager 280 also presents a user interface that allows users to specify a data stream language program visually rather than textually. Examples of screenshots of user interfaces presented by the user interface manager 280 are described herein.

The time series data store 260 stores data received from various sources, for example, servers 120. The time series data store 260 is also referred to herein as time series database or TSDB. In an embodiment, the time series data store 260 also stores the time series data after the data is quantized. The time series data store 260 may also store rollup data for each time series. The time series data store 260 also stores results of various analytics requests, for example, results of various reports requested by user. The analytics engine 270 computes results for certain reports, for example, moving averages over intervals of time by combining data stored in the time series data store 260 with new data obtained as data stream from various sources.

The software bus 290 provides a mechanism for modules to provide data of data streams to other modules. A data stream language program may send a data stream to the software bus 290. Other modules, for example, fetch module, find module, window module, and so on can read the data from the software bus 290 and perform further processing on the data. For example, a data stream output of a data stream language program published on the software bus 290 may be identified by a find block of another data stream language program executing as a job.

The alert manager 295 generates alerts and sends the alerts to specific users. In an embodiment, the alert manager 295 receives information from one or more other modules indicating that an alert needs to be sent. For example, the alert manager 295 may receive information describing an event that indicates an anomaly in a set of external systems or servers, for example, an indication that one or more servers have excessive resource utilization. The alert manager 295 is configured to generate an alert message. The alert manager 295 also stores information identifying specific users, for example, system administrators that need to be informed in case of specific situations. The alert manager 295 sends the generated alert to the appropriate user.

The data stream language processor 225 executes programs specified using the data stream language. The data stream language processor 225 receives a data stream language program, parses the data stream language program to validate the program. The data stream language processor 225 generates a representation of the data stream language program and executes the data stream language program using the representation.

The requests specified using the data stream language is a query based on the metadata associated with data received from various servers 120. The data stream language supports various types of analytic functions, for example, aggregations and transformations. The data stream language provides the ability to compose various functions including aggregations and transformations in various ways. In an embodiment, the data stream language processor 200 parses programs specified using the data stream language, generates an executable representation of the program, and executes the generated representation.

Figure 3:
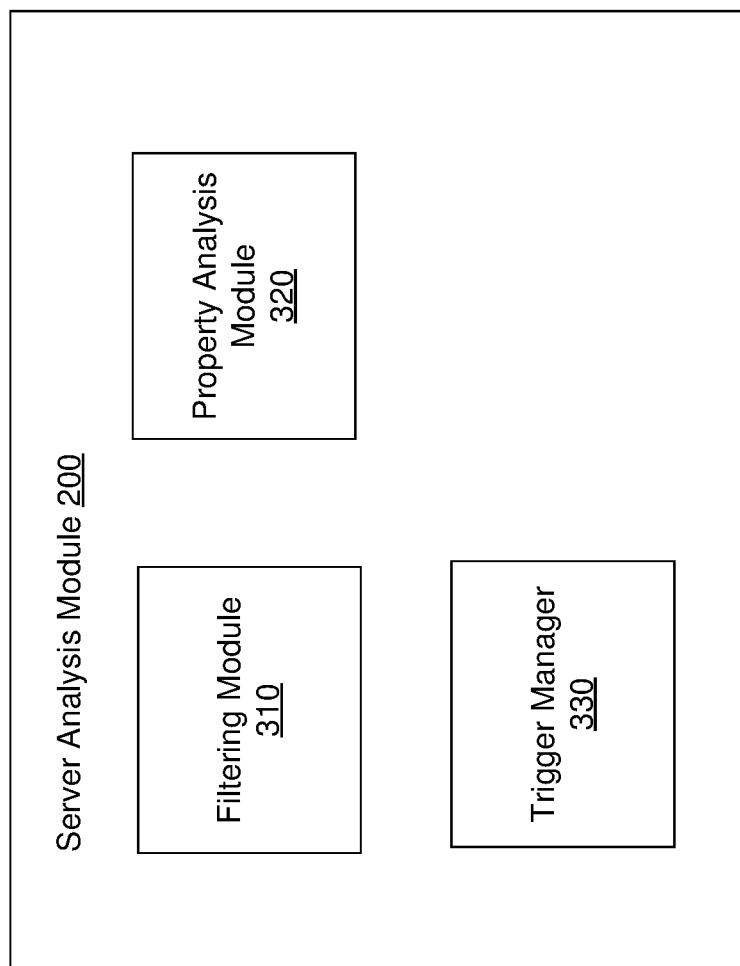
FIG. 3 shows the architecture of a server analysis module, according to an embodiment.

FIG. 3 shows the architecture the server analysis module, according to an embodiment. As shown in FIG. 3, the server analysis module 200 includes a filtering module 310, a property analysis module 320, and a trigger manager 330. Other embodiments may include more or less modules than those shown in FIG. 3. Certain modules are not illustrated in FIG. 3, for example, a parser. The details of each module are further described herein along with details of the types of blocks processed by each module.

The filtering module 310 receives filter expressions representing a filtering criterion. For example, the filter expression may specify a condition based on metadata attributes. For example, a filter expression may represents servers having excessive utilization, for example, servers having memory utilization greater than 90%. Alternatively, the filter expression may represent servers that are underutilized, for example, servers having CPU utilization below 20%.

The filtering module 310 determines a set of servers that satisfy the filter expression. The filtering module 310 may receive a condition based on user specification. For example, the user interface manager 280 may receive via a graphical user interface a set of values of a dimension and generate a condition based on the user input. Accordingly, a server satisfies the generated condition if the server has a value of a dimension that is within the specified set of values.

The filtering module 310 evaluates various servers to identify servers that satisfy the given condition. Accordingly, the condition acts as a filtering criterion. The filtering module 310 evaluates the specified condition on an ongoing basis such that the set of servers may change dynamically. For example, if the filtering criterion identifies servers having more than a threshold CPU utilization, the filtering module 310 repeatedly evaluates the filtering criterion to identify the set of servers that exceed the threshold server utilization. Accordingly, the filtering module 310 may determine that a server server1 satisfies the filtering criteria at time t1 but does not satisfy the filtering criteria at time t2 that occurs soon after time t1. Accordingly, the set S1 of servers that satisfy the filtering criteria at time t1 include the server server1 whereas the set S2 of servers determined at time t2 does not include server1.

The trigger manager 330 receives and stores triggers that determine whether certain events occur in a set of servers being monitored by the instrumentation analysis system 100. A trigger may be identified using an identifier, for example, a name for the trigger. A trigger specifies a condition that evaluates to true if certain event associated with the monitored servers occurs. The trigger further specifies an action to be taken if the specified condition is determined to be true. For example a trigger T1 may specify a condition that evaluates to true if more than a threshold number of servers have a resource utilization parameter that exceeds a threshold value. Accordingly, the trigger manager monitors the servers and evaluates the specified condition. If the specified condition evaluates to true, the trigger manager takes the specified action. Examples of actions specified include a message or email sent to a user, for example, an administrator describing the event that occurred. The trigger manager 330 may invoke the analytics engine 270 to evaluate the conditions of various triggers.

The property analysis module 320 receives information identifying a set of servers and analyzes the properties of the servers belonging to the set to determine one or more properties that characterize the set of servers. In an embodiment, a property is represented as a name value pair, where the name represents a dimension of servers and the value represents the value of the dimension. For example, the dimension of the server may be "datacenter" and the value may be "datacenter1". As another example, the dimension of the server may be "memory utilization" and the value at a given point in time may be 90%. The property analysis module 320 executes various processes described herein to determine properties that characterize a set of servers. In an embodiment, the property analysis module 320 determines a score for each property based on a comparison of a likelihood of a server from the filtered set of servers having the property with a likelihood of a server outside the filtered set of servers having the property. The property analysis module 320 may determine a score for a property based on a comparison of a likelihood of a server from the filtered set of servers having the property with a likelihood of a server from a set of servers comprising servers outside the filtered set of servers having the property.

In an embodiment, the property analysis module 320 determines a first value of a probability mass function for a selected dimension for servers in the filtered set. The property analysis module 320 determines a second value for the probability mass function for the selected dimension for a set of servers comprising one or more servers outside the filtered set. The set of servers comprising one or more servers outside the filtered set may be the entire set of servers that are not included in the filtered set, it may be a sample of servers that are not included in the filtered set, or it may be the complete set of servers associated with an enterprise reporting data streams to the instrumentation analysis system. The property analysis module 320 determines a score for the property as a function of the first value of the probability mass function and the second value of the probability mass function. The property analysis module 320 may determine a score for a property as a difference of the first value of the probability mass function and the second value of the probability mass function. Alternatively, the property analysis module 320 may determine a score for a property as a ratio of the first value of the probability mass function and the second value of the probability mass function. Accordingly, a high score for a property indicates a high value of difference between the likelihood of occurrence of the property in the filtered set of servers compared to a set of servers including the remaining servers outside of the filtered set.

Overall Process for Analyzing Servers

Figure 4:
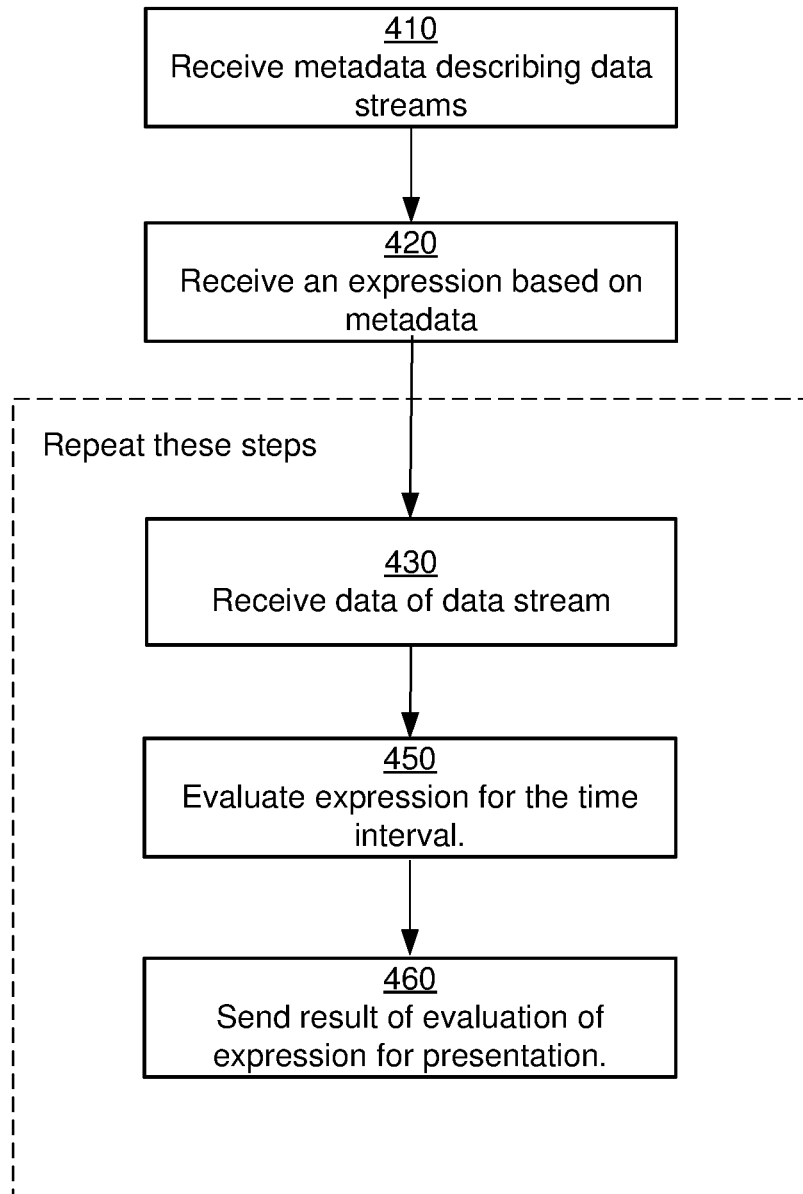
FIG. 4 illustrates a process for evaluating expressions associated with data streams, according to an embodiment.

FIG. 4 illustrates a process for evaluating expressions associated with data streams, according to an embodiment. The metadata module 220 receives 410 metadata describing data streams. The metadata definition is received independent of the data of the data streams themselves. For example, the data stream may simply provide tuples comprising a data value and a timestamp associated with the data value without providing any properties (for example, name-value pairs.) The metadata module 220 receives the properties describing the data streams from a source different from the source providing the data stream. For example, the data streams are provided by instances of instrumented software that is executing on server 120, whereas the metadata definition may be provided by a system administrator via the administration system 160.

The analytics engine 270 receives 420 an expression based on one or more metadata attributes. In an embodiment, the expression received 420 represents certain filtering criteria received from a graphical user interface. For example, the user interface manager 280 may present a graphical interface displaying various dimensions and graphical representation of various servers. The user interface manager 280 receives a selection of values of a dimension provided by the user via the graphical user interface, for example, a range (or set) of values of a particular dimension or a plurality of ranges (or sets) of values, each for a particular dimension. The user interface manager 280 provides the user input to the analytics engine 270. The analytics engine 270 generates an expression based on the set of values or range of values of the dimension.

In an embodiment, the input expression represents a condition in a stored trigger. For example, a condition may represent an occurrence of excessive resource utilization in a set of servers. The analytics engine 270 evaluates the expressions representing conditions of triggers to check if a condition is satisfied. In an embodiment, the trigger manager 330 of the server analysis module 200 invokes the analytics engine 270 to evaluate conditions of triggers.

The instrumentation analysis system 100 repeats the following steps as data of various data streams is received by the instrumentation analysis system 100 from various servers 120. The interface module 210 receives 430 data of different data streams. In an embodiment, the interface module 210 waits for a fixed interval of time, for example, 1 second or a few seconds and collects data received from different data streams. In an embodiment, the quantization module 240 performs quantization of the data for each incoming data stream for each time interval. Accordingly, data from each data stream is aggregated into a single value associated with the data stream for that time interval.

The analytics engine 270 executes 440 the data stream language program based on the data of the data streams for the time interval. If the data is quantized for each data stream, the analytics engine 270 evaluates 450 the data stream language program using the quantized values from each data stream. The data stream language program may include a publish block that causes the analytics engine 270 to send 460 the result(s) of evaluation of the data stream language program for presentation, for example, to a user interface.

User Interface for Analyzing Servers Executing Instrumented Software

Figure 5A:
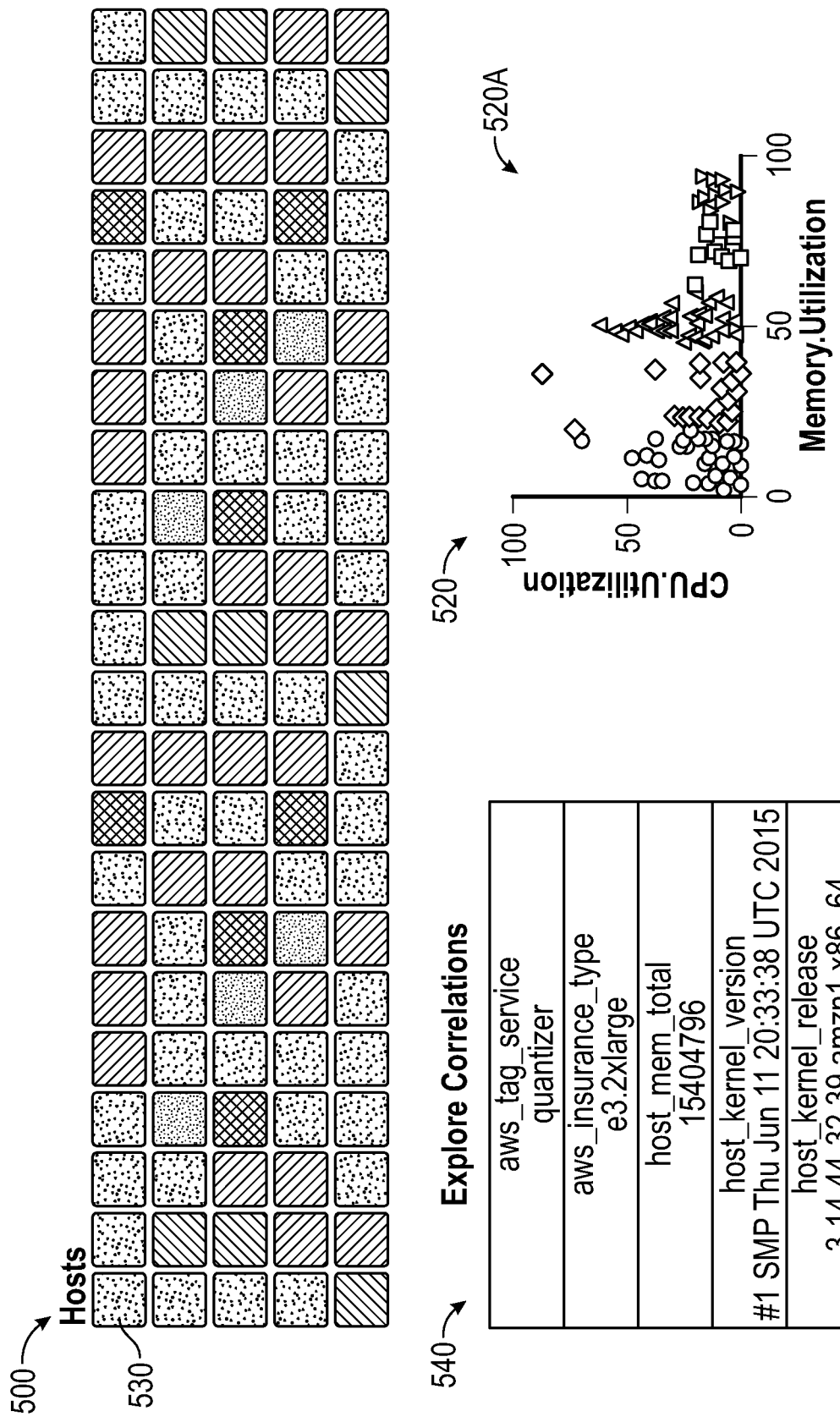
FIGS. 5A-5C shows a screenshot of a user interface for analyzing servers executing instrumented software, according to an embodiment.
Figure 5B:
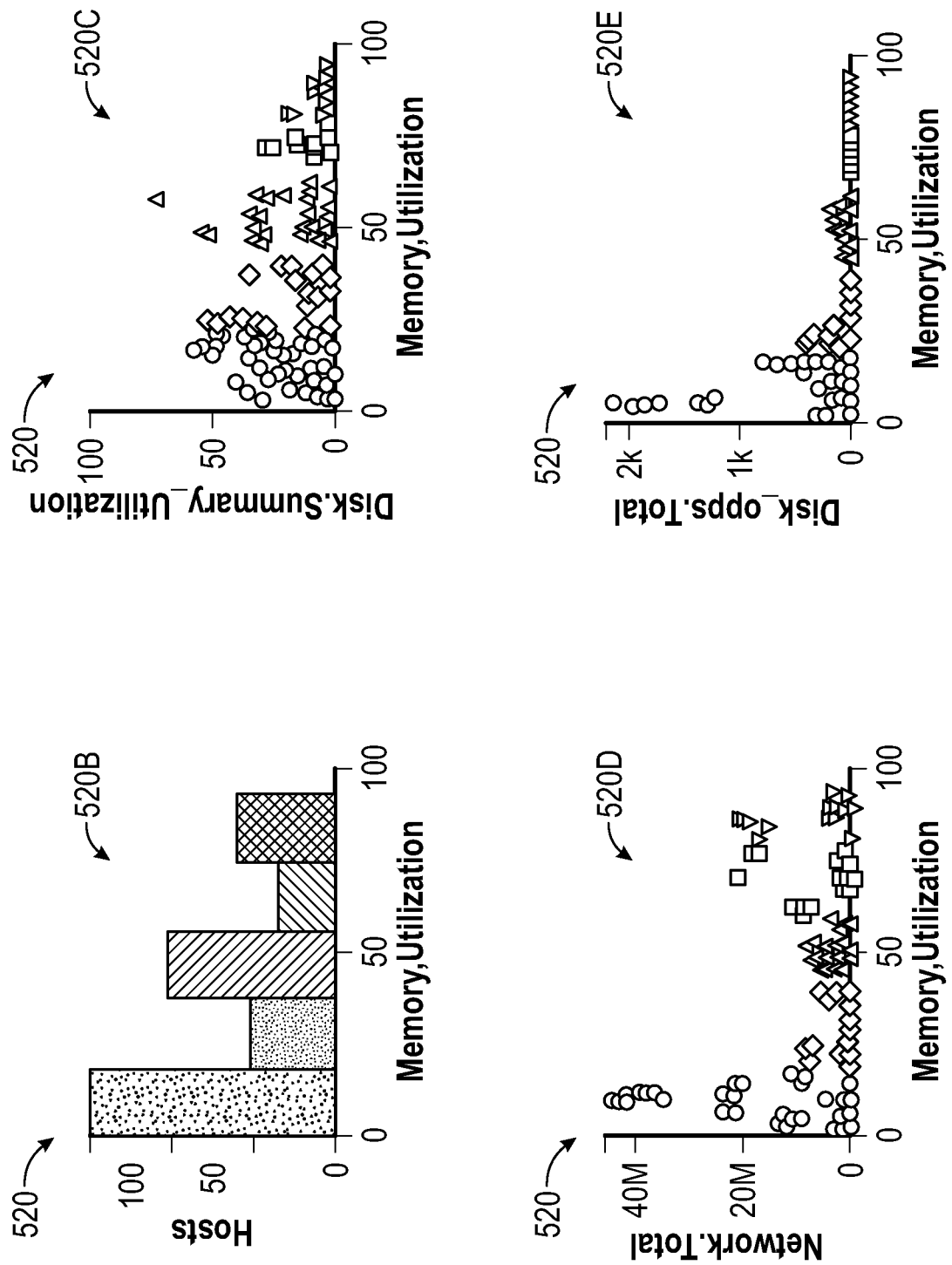
Figure 5C:
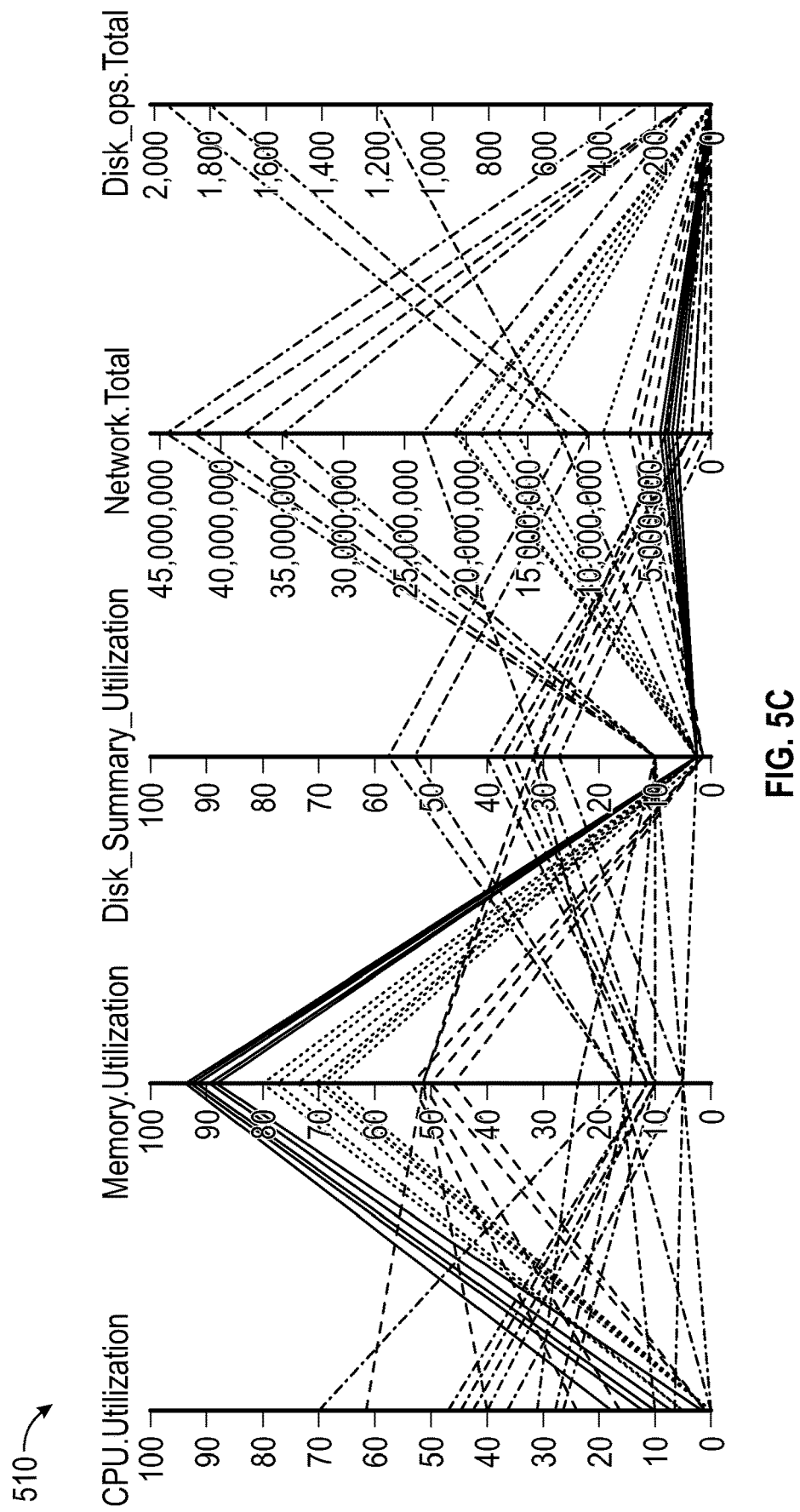

FIGS. 5A-5C show portions of a screenshot of a user interface for analyzing servers executing instrumented software, according to an embodiment. FIGS. 5A-5C show various visual representations of information describing servers. The various portions of the screenshot shown in FIGS. 5A-5C may be shown in the same screen of a user interface. These include a chart 510 illustrated in FIG. 5C, showing a set of dimensions of servers, a plurality of charts 520 shown in FIG. 5C, each showing servers using two dimensions, and chart 530 shown in FIG. 5A showing a heat map of servers showing values of a single dimension. A chart comprises a visual representation of one or more dimensions describing servers and geometric objects representing servers along the one or more dimensions. The geometric objects may be points, lines, curves, shapes, for example, circles, squares, rectangles and so on.

The user interface 500 comprises a widget representing a chart 510 that comprises axes representing various dimensions of the server. The chart 510 shows dimensions of servers representing various measures associated with resource utilization of servers, for example, memory utilization, disk utilization, CPU utilization, and so on. In an embodiment, the chart 510 is a parallel coordinate graph in which various axes are parallel to each other. Accordingly, a server is represented by a set of segments or curves that connect the value of each dimension as shown in the chart 510. For example, assume that a server S1 has a value v1 for dimension d1, value v2 for dimension d2, value v3 for dimension d3, and value v4 for dimension d4. The server S1 is represented by a set of segments comprising a segment connecting the point representing value v1 on the axis representing dimension d1 with the point representing value v2 on the axis representing dimension d2, a segment connecting the point representing value v2 on the axis representing dimension d2 with the point representing value v3 on the axis representing dimension d3, and a segment connecting the point representing value v3 on the axis representing dimension d3 with the point representing value v4 on the axis representing dimension d4. Alternatively, the server S1 may be represented by a curve that passes through the point representing value v1 on the axis representing dimension d1, the point representing value v2 on the axis representing dimension d2, the point representing value v3 on the axis representing dimension d3, and the point representing value v4 on the axis representing dimension d4.

The widget displaying chart 510 is configured to receive a selection of a dimension. Accordingly, the user interface 510 receives a selection of an axis representing a dimension via the chart 510. For example, as shown in FIGS. 5A-5C, the user interface 510 receives the selection of the axis representing memory utilization.

In an embodiment, the charts 520 are scatter plots showing distribution of charts along one or more dimensions. Responsive to receiving the selection of a particular dimension via chart 510, the charts 520 are modified such that each chart shows servers with respect to a pair of dimensions (or a plurality of dimensions) including the selected dimension. For example, chart 520*a* shows servers with respect to CPU utilization vs. memory utilization, chart 520*c* shows servers with respect to disk summary utilization vs. memory utilization, chart 520*d* shows servers with respect to network total utilization vs. memory utilization, and chart 520*d* shows servers with respect to disk operations total utilization vs. memory utilization. The chart 520*b* shows a histogram of all servers distributed over memory utilization.

Responsive to receiving the selection of a particular dimension, the user interface manager 280 updates the user interface 500 to show a chart 530 (for example, a heat map) showing values of the selected dimension for various servers. In an embodiment, the chart 530 represents each server by a shape such that the properties of the shape represent the value of the selected dimension of the server. Examples of properties of shapes include color of the shape, size of the shape, a shading of the shape, a brightness of the shape and so on.

The chart 530 allows users to identify any servers for which the selected dimension has a value that indicate problems. For example, the user may identify servers for which the memory utilization is above a threshold value by selecting a particular value of high memory utilization. The user interface manager 280 updates the chart 530 by selecting all servers having the selected value of the dimension. This process may be repeated to select a plurality of values. The server analysis module 200 generates a filter criteria based on the selected values for performing analysis of the servers.

The user interface 500 shows a ranked list of properties 540 of servers reporting data for the selected dimension. The properties 540 represent values of the selected dimension. The ranking of the properties 540 is based on a score indicative of a strength by which the property characterizes servers reporting data for the selected dimension. In an embodiment, the properties 540 are ranked based on the likelihood that a randomly selected server has a particular property. For example, the highest ranked property 540 is the property that has the highest frequency of occurrence in the set of servers reporting data for the selected dimension.

Figure 6A:
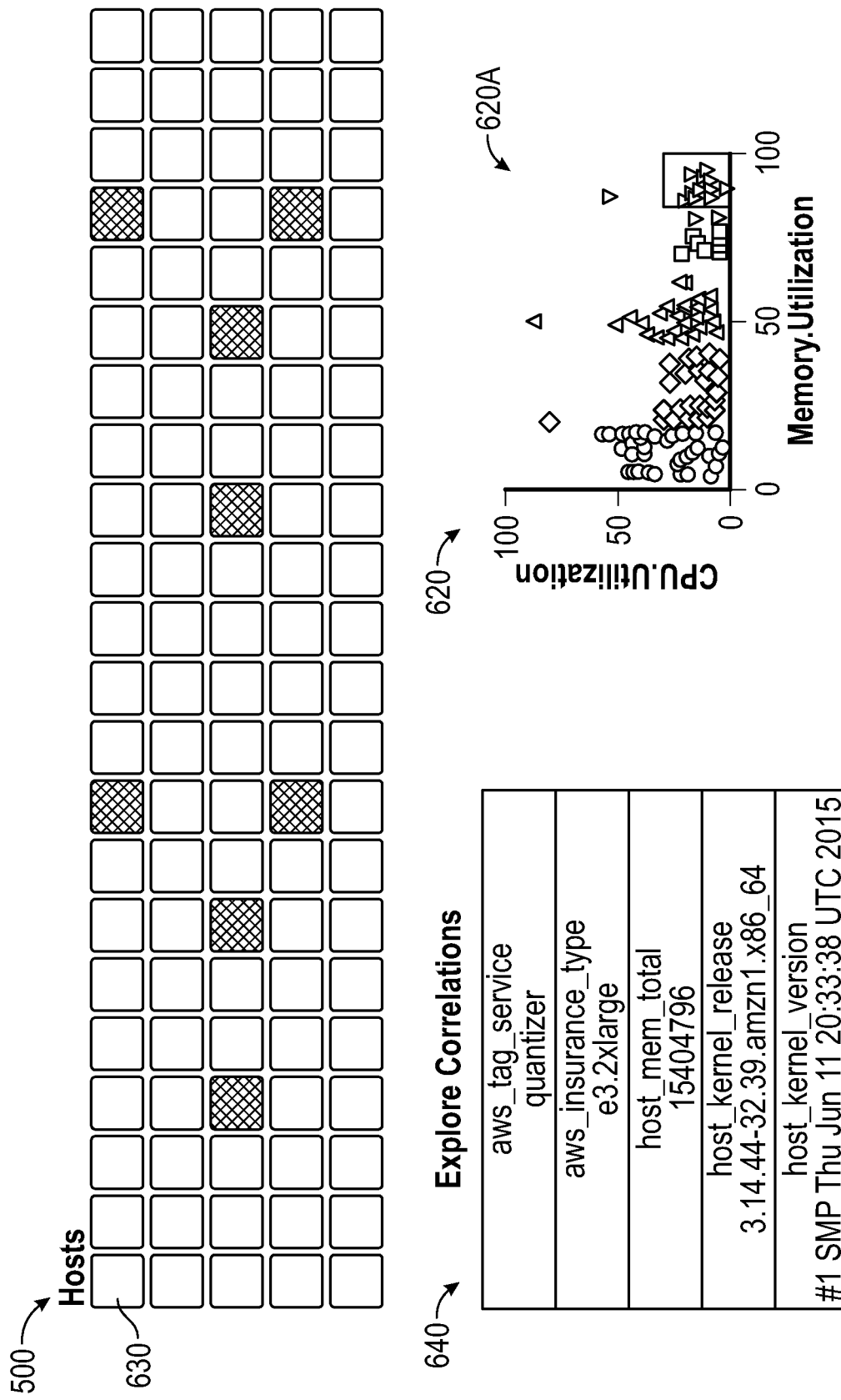
FIGS. 6A-6C shows a screenshot of a user interface displaying filtering of servers based on properties, according to an embodiment.
Figure 6B:
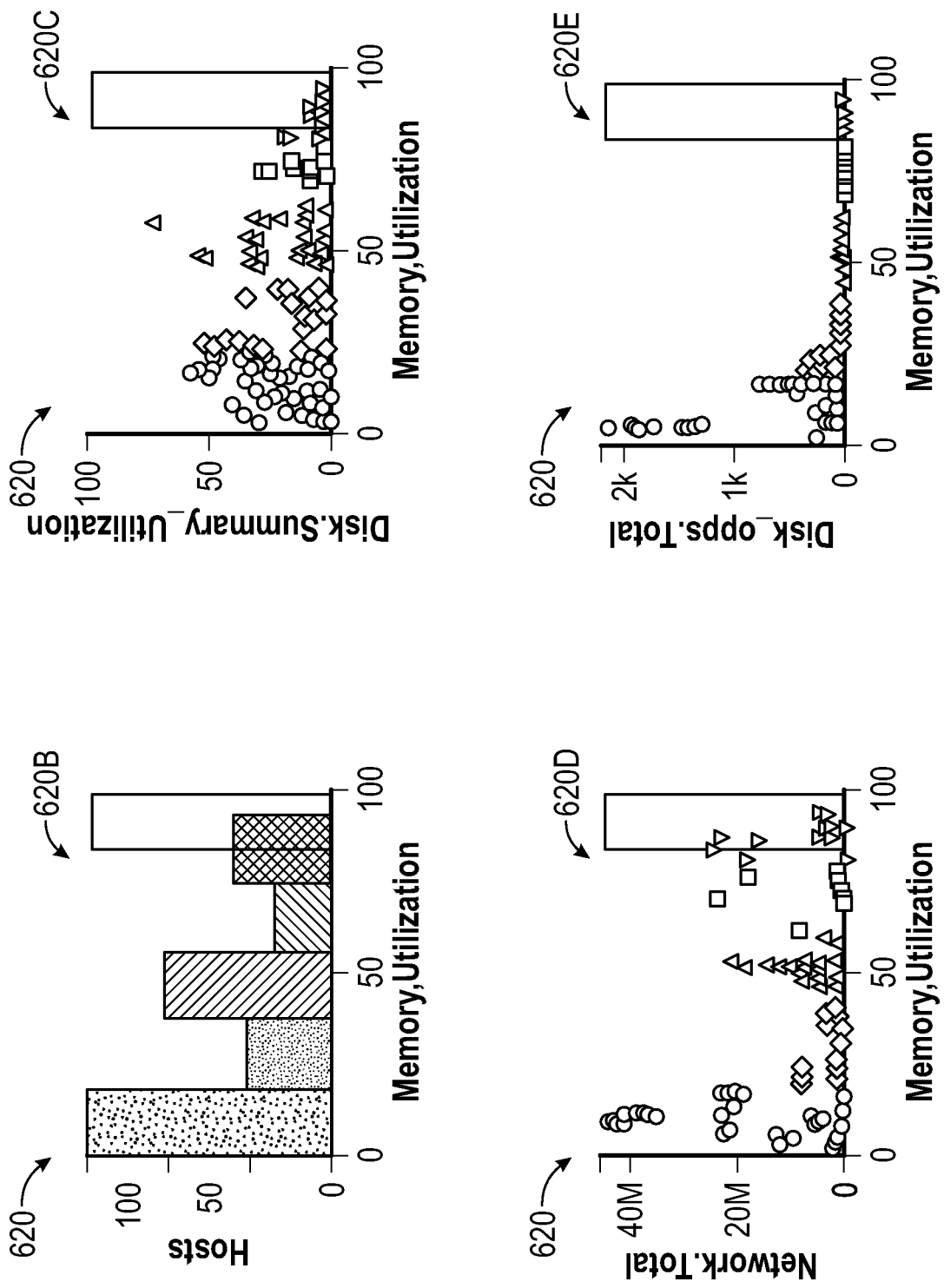
Figure 6C:
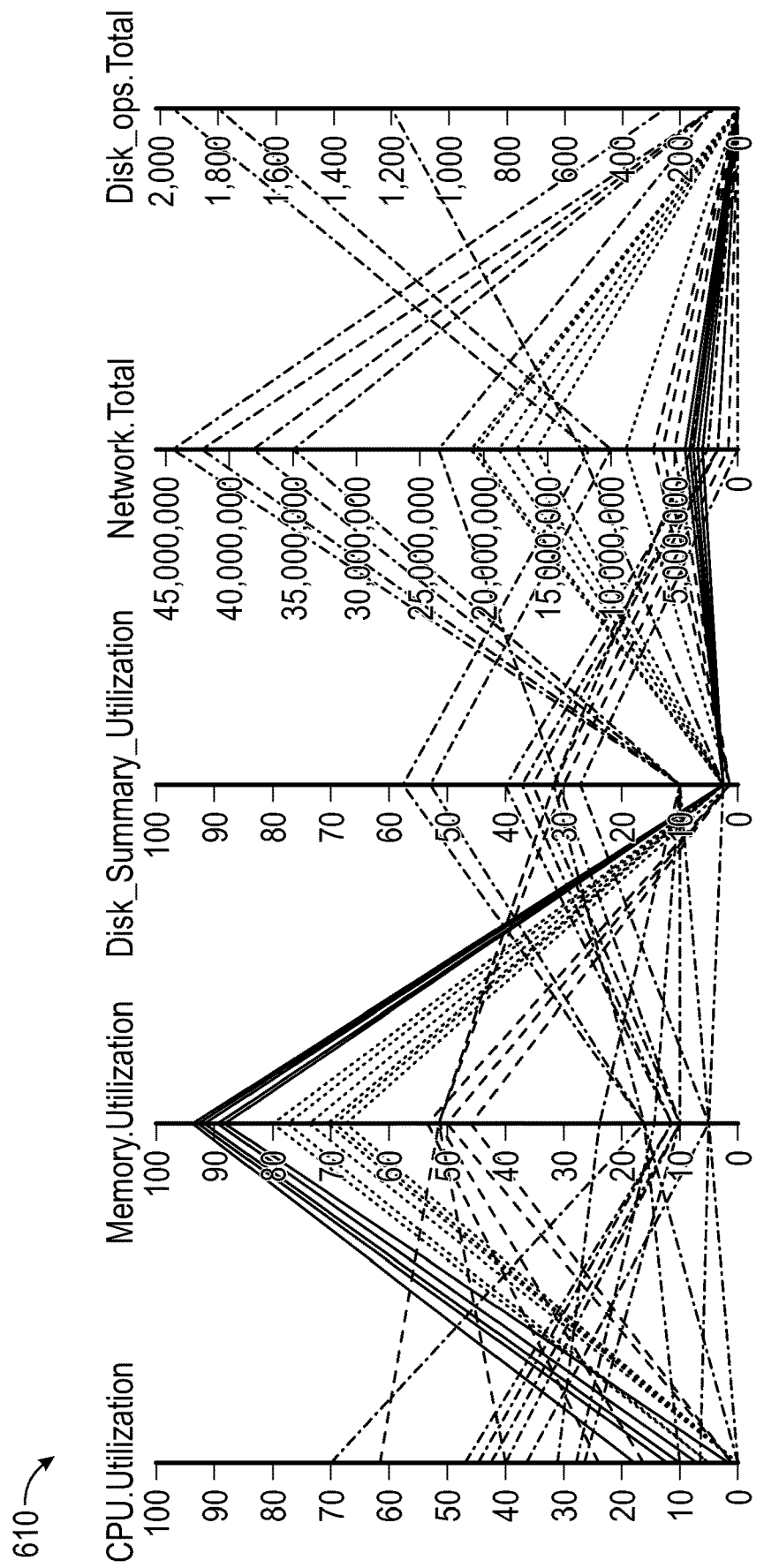

FIGS. 6A-6C show portions of a screenshot of a user interface displaying filtering of servers based on properties, according to an embodiment. The various portions of the screenshot shown in FIGS. 6A-6C may be shown in the same screen of a user interface. The user can specify filtering criteria based on one or more of the charts shown in FIGS. 6-8. The user may specify a first criterion based on a first chart and then a second criterion based on a second chart, and so on. Accordingly, the user interface 500 allows users to visually define a filtering criterion by iteratively using one or more charts. A chart receives a filtering criterion and updates all charts to display only the subset of servers that satisfy the filtering criteria. The visualization of the subset of servers allows users to view the characteristics of the subset via the displayed charts. The user may modify the filtering criterion to specify a modified filtering criterion. The user interface receives the modified filtering criterion via one or more charts.

For example, the user interface 500 may receive a filtering criterion representing a set or range of values of a dimension D1 selected using the chart 510. The instrumentation analysis system determines a subset S1 of servers that have a value of the dimension D1 within the selected range or subset. The user interface updates the chart 510, 520, and 530 to show the subset S1 of servers and hide the remaining servers. The updated charts are shown as charts 610, 620, and 630 in FIGS. 6A-6C. The chart 520 is updated to show the subset S1 of servers and shown as charts 620 in FIGS. 6A-6B. Similarly, user interface 500 updates the chart 530 to show the subset S1 of servers as chart 610 in FIG. 6C. The user may further modify the ranges or subsets of values of dimension D1 using the chart 510.

Alternatively, the user may select a set of servers displayed by any one or the chart 620, chart 630 or chart 610. The user interface 500 receives the modified filtering criterion via the chart 620, chart 630 or chart 610. In an embodiment, the server analysis module 200 identifies clusters of servers by executing a clustering process. The user interface 500 presents the identified clusters in the charts 610, 620, or 630, for example, by visually distinguishing servers of a cluster from servers of other clusters. The user interface 500 receives a selection of a cluster of servers via chart 620 or chart 630.

In an embodiment, the server analysis module 200 automatically identifies a cluster of servers representing outliers having values more than a threshold away from a mean value of the dimension. The server analysis module 200 automatically identifies a cluster of servers with more than a threshold likelihood of occurrence of an outlier. The server analysis module 200 automatically determines a filtering criterion based on the identified cluster of servers. The trigger manager 330 receives the automatically determined filtering criterion and uses them for generating triggers based on the automatically determined filtering criterion.

The instrumentation analysis system 100 determines the range of values or set of values selected by the user and build an expression representing the filtering criteria. For example, the filtering criteria may be represented as one or more pairs of dimension names and sets or ranges of values for the dimension. In an embodiment, if the instrumentation analysis system 100 receives a first filtering criteria f1 via a first chart and a second filtering criteria f2 via a second chart, the instrumentation analysis system 100 determines a combined filtering criteria as a logical expression based on the first filtering criteria and the second filtering criteria, for example, f1 and f2 and uses the combined filtering criteria as the filtering criteria specified by the user. Other embodiments of the instrumentation analysis system 100 receive filtering criteria using a script that comprises a set of commands represented as instructions that may not be represented visually as charts.

The user interface 500 displays properties 640 representing characteristics of the selected subset of servers. The instrumentation analysis system 100 ranks the properties 640 of servers based on a score indicative of a strength by which the property characterizes the servers of the subset, for example, by a score indicative of a strength by which the property distinguishes servers of the set from remaining servers.

Figure 7A:
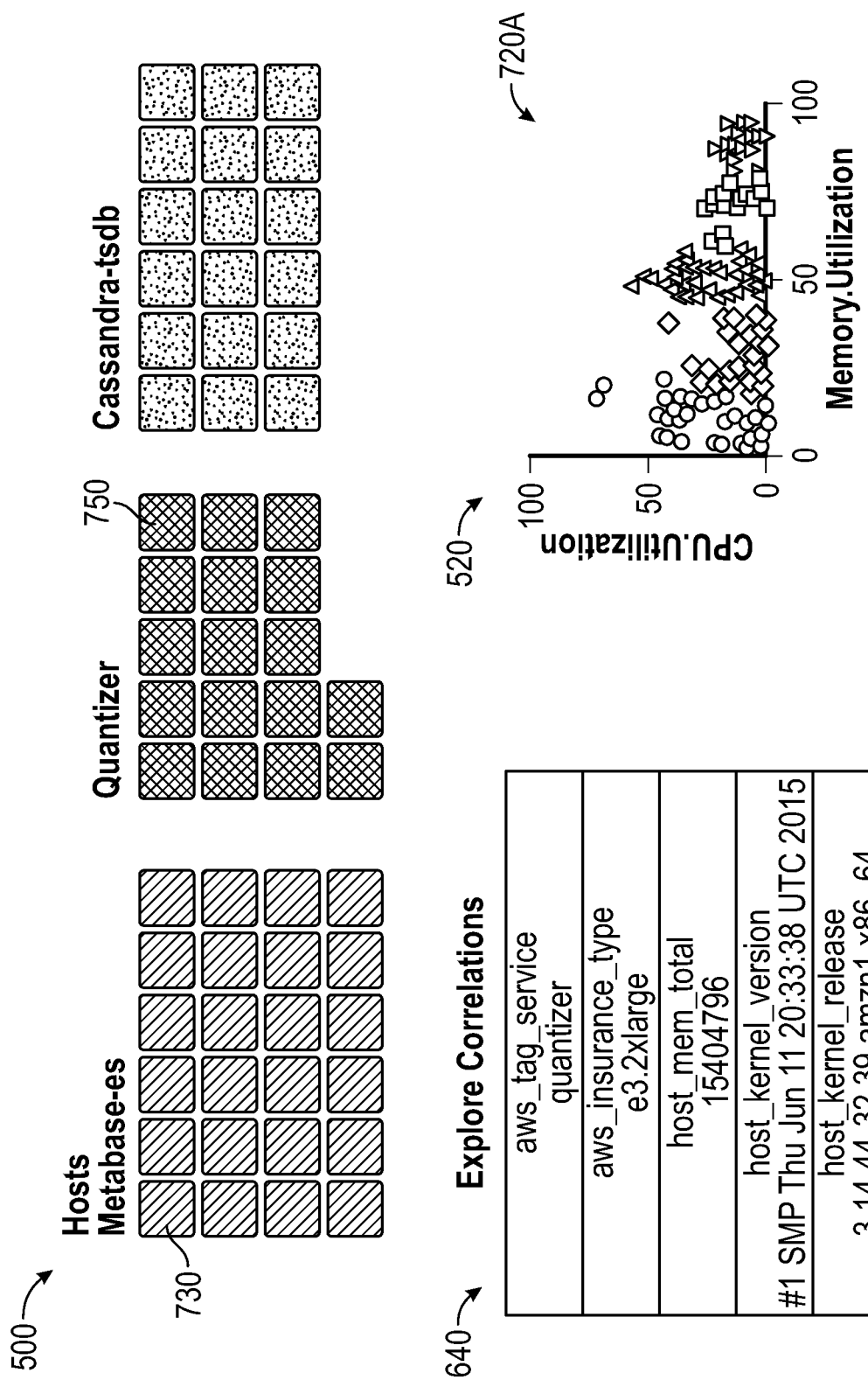
FIGS. 7A-7C shows a screenshot of a user interface displaying properties of servers executing instrumented software, according to an embodiment.
Figure 7B:
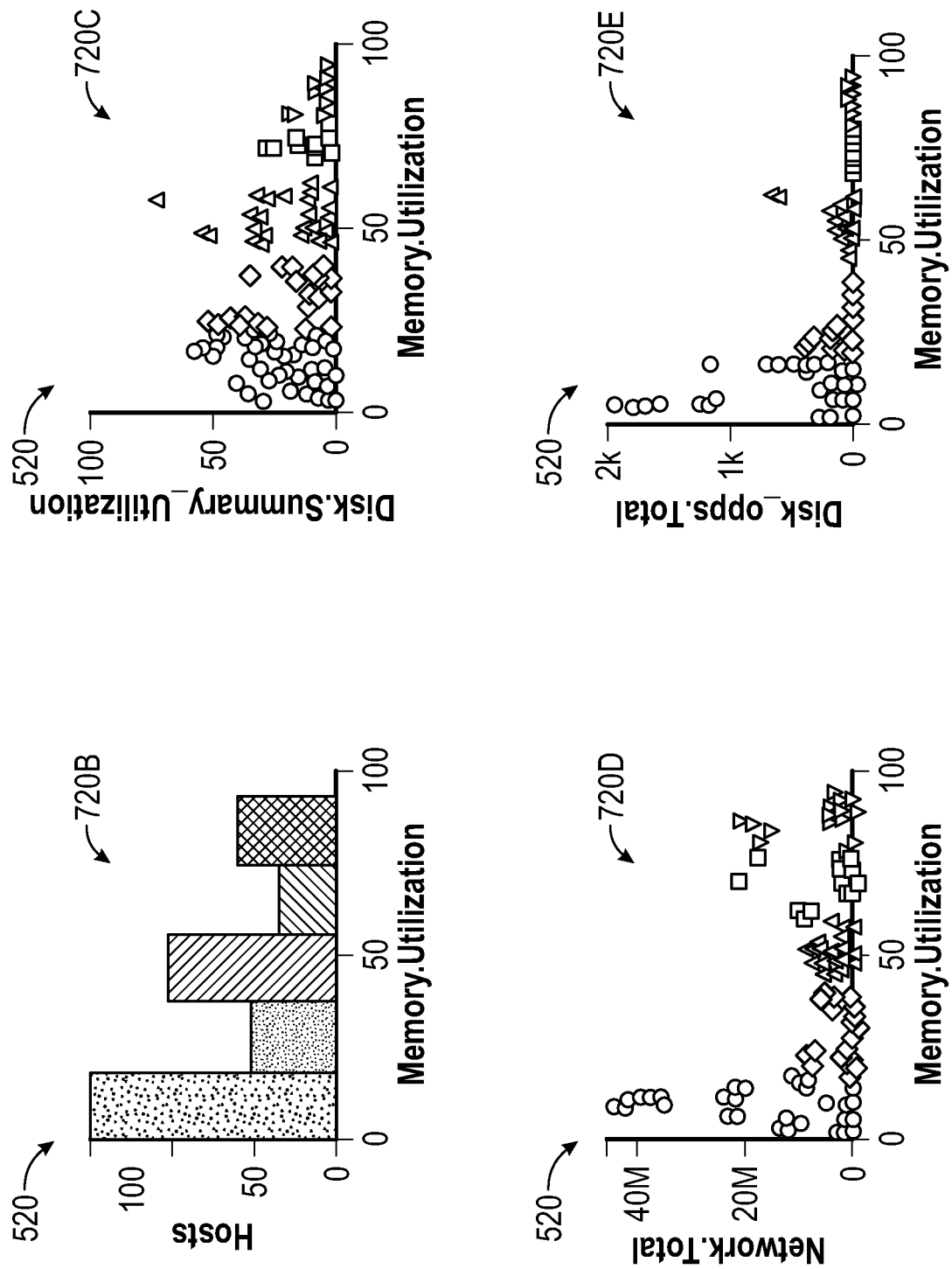
Figure 7C:
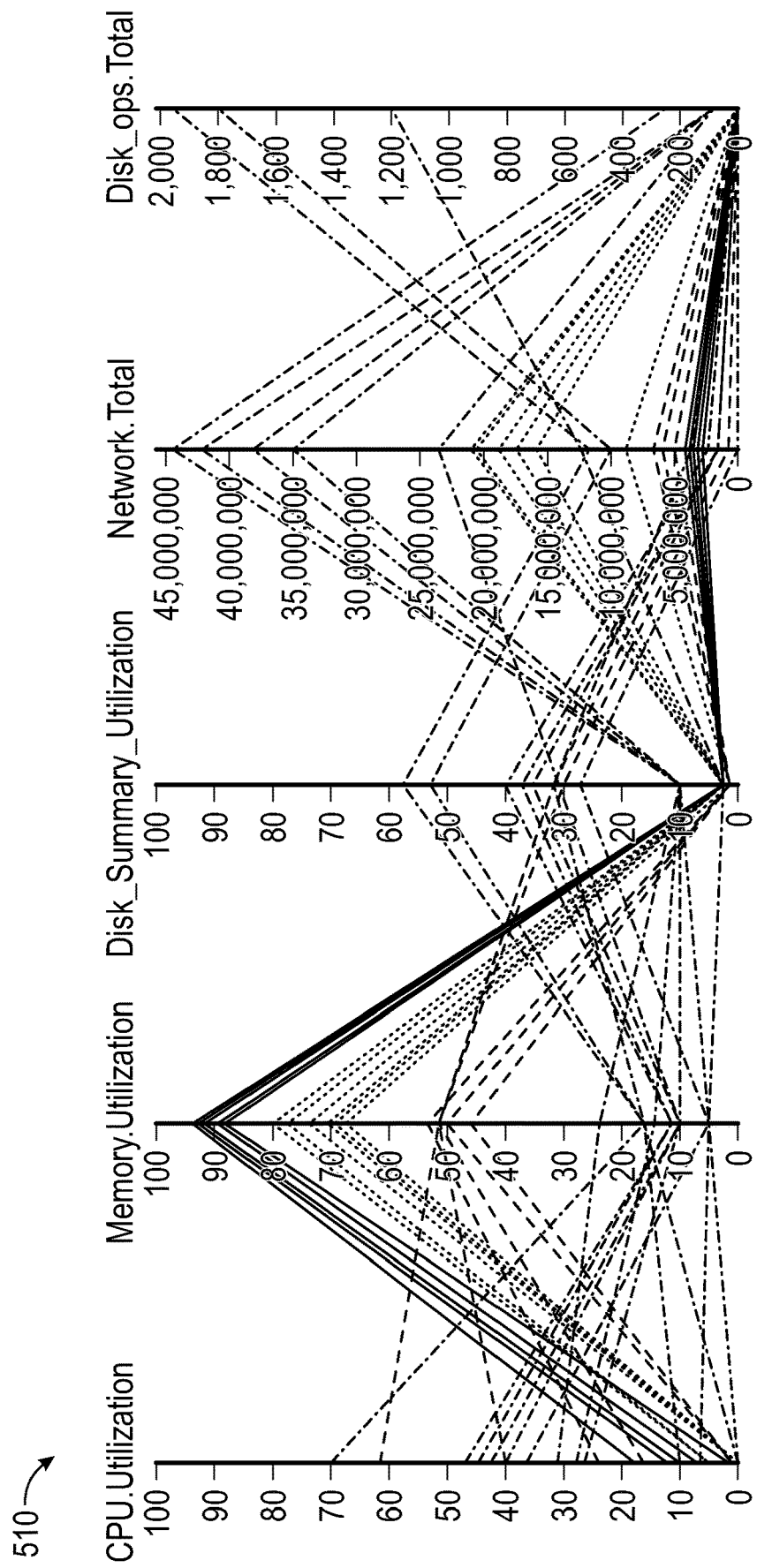

FIGS. 7A-7C show portions of a screenshot of a user interface displaying properties of servers executing instrumented software, according to an embodiment. The various portions of the screenshot shown in FIGS. 7A-7C may be shown in the same screen of a user interface. The instrumentation analysis system 100 receives a selection of a first dimension via chart 510. The instrumentation analysis system 100 presents a chart 730 displaying a heat map of a set of servers based on the first dimension as shown in FIG. 7A. The user interface 500 presents properties 640 that characterize the set of servers reporting values of the first dimension as shown in FIGS. 7A-7C or a subset of servers as shown in FIGS. 7A-7C. The user interface 500 receives a selection of a property 640 that represents a value of a second dimension. The user interface manager 280 shows the chart 730 that displays the heat map of chart 730 such that the servers are grouped by the values of the second dimension. Accordingly, each group 750 represents servers reporting the same value of the second dimension. The chart 730 presents the distribution of servers based on specific property values that are reported.

Process for Analyzing Servers Executing Instrumented Software

Figure 8:
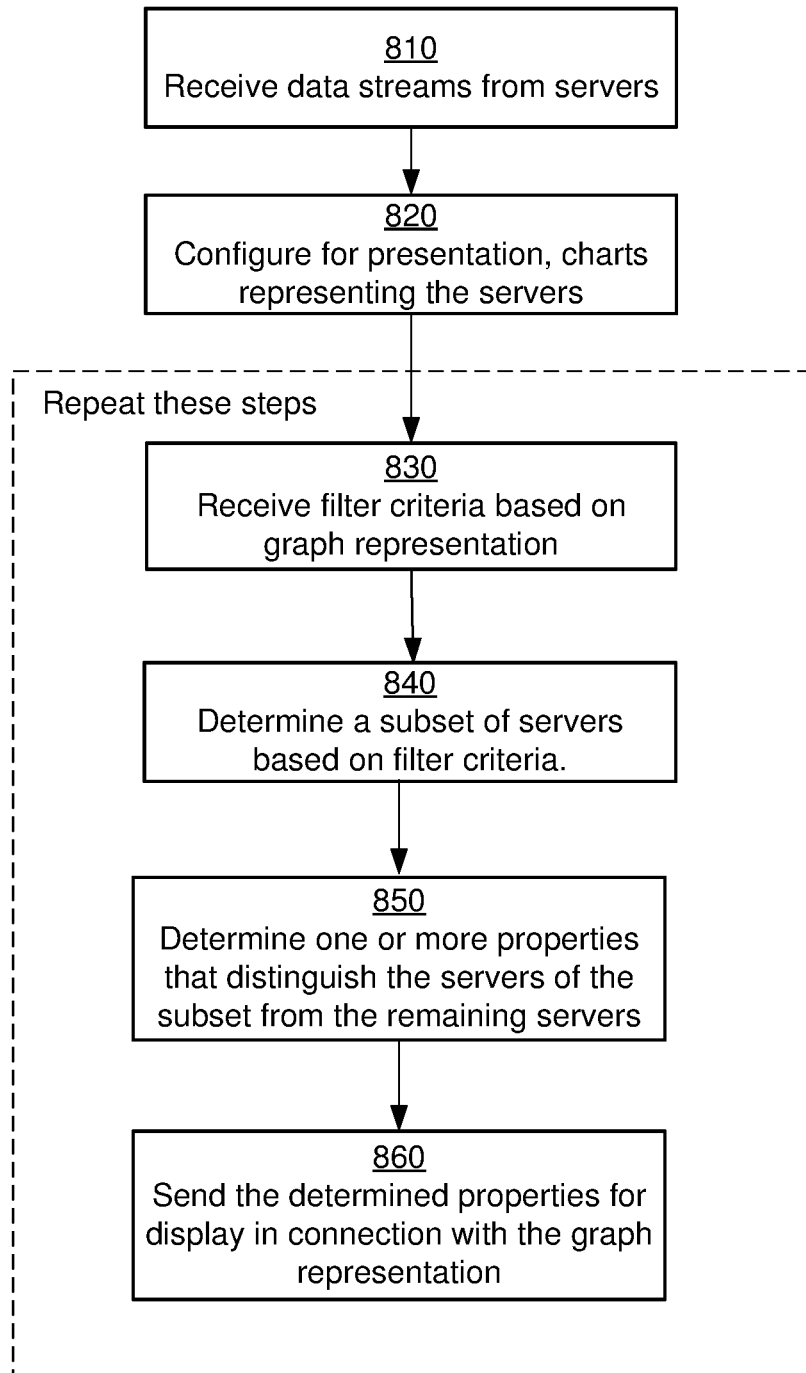
FIG. 8 shows the overall process for analyzing properties of servers, according to an embodiment.

FIG. 8 shows the overall process for analyzing properties of servers, according to an embodiment. The interface module 210 receives 810 data streams from a plurality of servers. The received data streams represent various types of data generated by instrumented software, for example, data representing resource utilization of a server executing the instrumented software. The user interface manager 280 configures 820 for presentation user interfaces comprising charts representing servers, for example, as shown in FIGS. 5, 6, and 7.

The user interface manager 280 presents a user interface 500 that allows users to repeatedly perform the following steps for analysis of the servers. The filter module 310 receives 830 from the user interface manager 280, filtering criteria specified by a user for determining a subset of servers sending the data streams received by the instrumentation analysis system 100. The filtering criteria specifies one or more dimensions representing attributes of the servers and a set of values or a range of values for each dimension specified.

The filter module 310 determines 840 a subset of servers from the plurality of servers based on the specified filtering criteria such that each server in the subset satisfies the filtering criteria and remaining servers of the plurality of servers do not satisfy the filtering criteria. For example, the filtering criteria may specify that the CPU utilization of each server that satisfies the filtering criteria must be above a given threshold. Accordingly, the filter module 310 compares the CPU utilizations of the servers with the specified threshold and includes all servers that have CPU utilization above the threshold value in the subset and excludes servers with CPU utilizations below (or equal to) the threshold from the subset.

The property analysis module 320 determines 850 one or more properties of the servers from the subset of servers that distinguish servers of the subset from remaining servers of the plurality of the servers. Accordingly, the one or more determined properties characterize the subset of servers. The property analysis module 320 provides the determined properties to the user interface manager 280. The user interface manager 280 sends the one or more determined properties for presentation via a user interface displayed on a client device.

Figure 9:
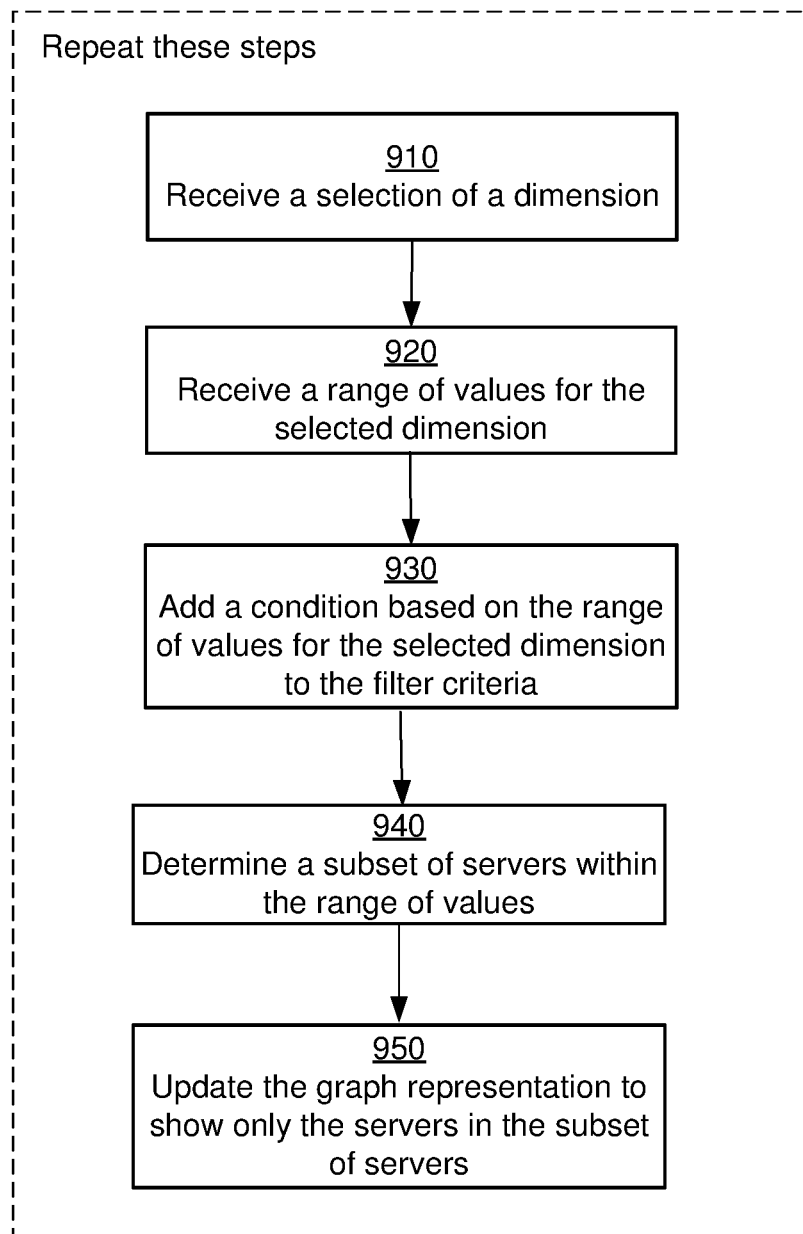
FIG. 9 shows the overall process for receiving filtering criteria for identifying servers for analysis, according to an embodiment.

FIG. 9 shows the overall process for receiving filtering criteria for identifying servers for analysis, according to an embodiment. The user interface manager 280 presents a user interface configured to perform interactions with the user for receiving the filtering criteria. The user interface presents a graphical representation of a plurality of servers, the graphical representation comprises a plurality of axes, each axis representing a dimension. Accordingly, each server is associated with a plurality of dimensions.

The filtering module 310 receives 910 via the user interface manager 280 a selection of a dimension from the plurality dimensions. In an embodiment, the selection of dimension corresponds to a measure of resource utilization for the servers. For example, the filtering module 310 may receive a selection of a dimension representing memory utilization. The user interface manager 280 adjusts various graphical representations of the plurality of servers based on the selection of the dimension. For example, the user interface manager 280 may update the user interface to display a heat map of the servers based on the selected dimension.

The filtering module 310 further receives 920 from the user via the user interface manager 280 a range of values or a set of values for the selected dimension. For example, if the filtering module 310 receives a selection of a dimension representing memory utilization, the filtering module 310 may further receive a range of memory utilization from 80% to 100%. Accordingly, the instrumentation analysis system 100 receives a request from the user to determine a subset of the plurality of users comprising servers with memory utilization within 80% to 100%.

The filtering module 310 builds the filtering criteria by adding 930 a condition based on the selected dimension and the specified range of values. For example, the filtering module 310 may add a condition "(memory utilization in 80%-100%)" to the filtering criteria. If the filtering criteria has a non-null condition, the filtering module 310 updates the filtering criteria based on a conjunction of the existing filtering criteria and the new condition. For example, if the current filtering criteria is C, the filtering module 310 updates the filtering criteria in the presents example to be "C and (memory utilization in 80%-100%)."

The filtering module 310 determines 940 a subset of the servers that satisfy the updated filtering criteria. The user interface manager 280 updates 950 the user interface to show only the servers in the determined subset. For example, the heat map of servers based on the selected dimension is undated to show only the subset of servers.

Figure 10:
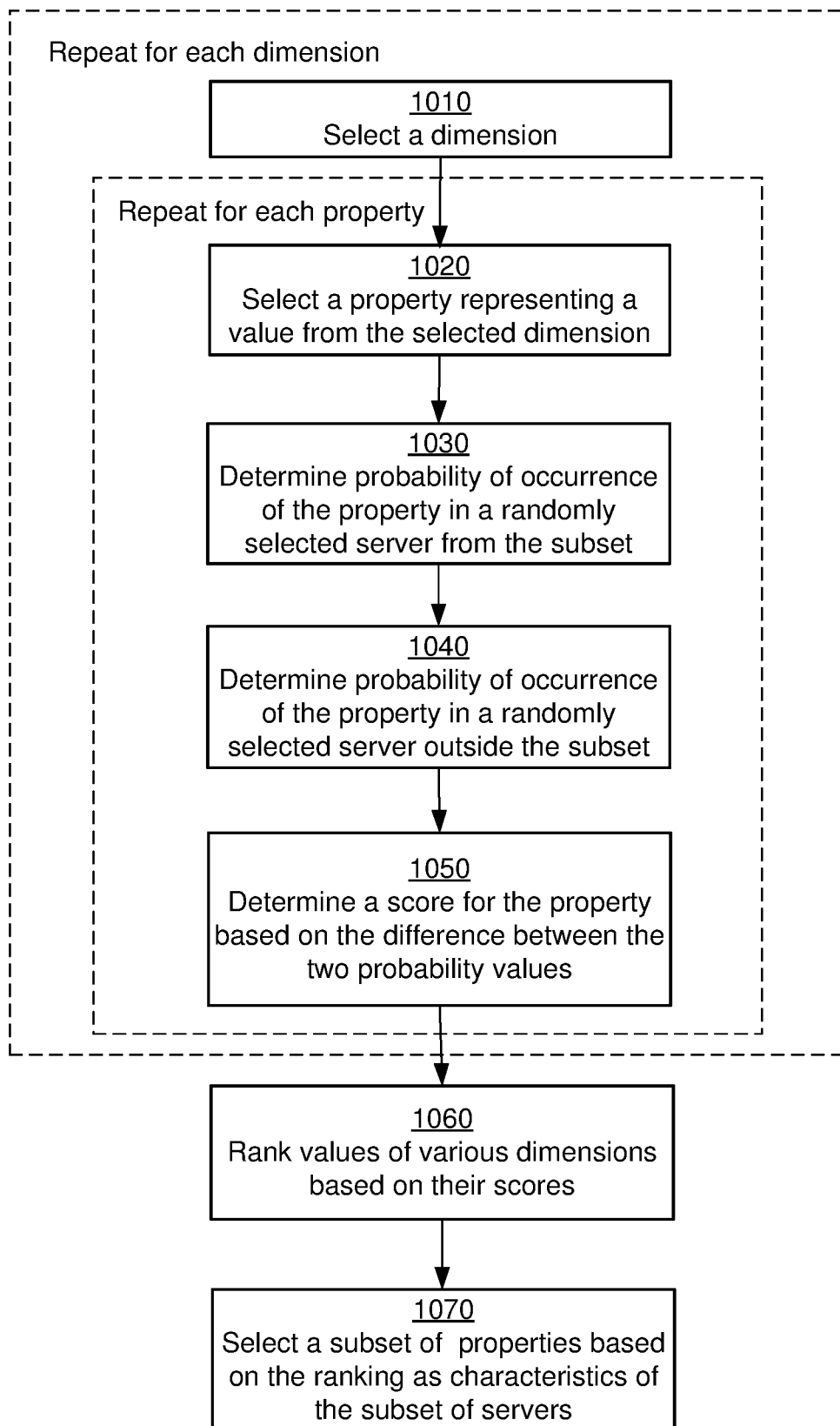
FIG. 10 shows the overall process for identifying properties representing characteristics of a subset of servers, according to an embodiment.

FIG. 10 shows the overall process for identifying properties representing characteristics of a subset of servers, according to an embodiment. The property analysis module 320 analyzes various properties of servers to determine properties that over-represent the servers of the subset of servers obtained by filtering the plurality of servers analyzed by the instrumentation analysis system 100.

The property analysis module 320 selects 1010 a dimension of the servers for analysis. The property analysis module 320 analyzes each property associated with the selected dimension. Each property represents a value for the dimension of the server. In an embodiment, a property represents a range of values for the dimension.

The property analysis module 320 selects 1020 a property representing a value of the selected dimension for analysis. The property analysis module 320 determines 1030 a probability of occurrence of the selected property in a randomly selected server from the subset of servers obtained by applying the filtering criteria to the plurality of servers analyzed by the instrumentation analysis system 100. The property analysis module 320 further determines 1040 a probability of occurrence of the selected property in a randomly selected server from the remaining set of servers outside the subset of servers.

The property analysis module 320 may determine 1020 the probability of occurrence of the selected property in a set of servers based on a rate of occurrence of the property in the set of servers. For example, the property analysis module 320 may sample a subset of servers of the set and determine the number of servers that have the property. The property analysis module 320 determines the probability of occurrence of the property as a ratio of the number of servers of the sample set and the total number of servers of the sample set. In an embodiment, the sample set is the entire set, for example, if the size of the set is small, i.e., below a threshold value.

The property analysis module 320 determines 1030 a score for the property, such that the score is indicative of the difference between the two probability values, i.e., a first probability value representing the probability of occurrence of the selected property in a randomly selected server from the subset of servers and a second probability value representing the probability of occurrence of the selected property in a randomly selected server from the remaining set of servers. In an embodiment, the score of a property is determined to be a value that is proportionate with the difference between the first probability value and the second probability value. In another embodiment, the score of a property is determined to be a value that is proportionate with the ratio of the first probability value and the second probability value. Accordingly, if a property is over-represented in the subset of servers, the property analysis module 320 assigns a high score to that property and if a property is under-represented in the subset of servers, the property analysis module 320 assigns a low score to that property.

In an embodiment, the property analysis module 320 determines the probability of occurrence of the property in the entire plurality of servers. Accordingly, the property analysis module 320 determines a score for the property such that the score is indicative of the difference between two probability values, i.e., a first probability value representing the probability of occurrence of the selected property in a randomly selected server from the subset of servers and a second probability value representing the probability of occurrence of the selected property in a randomly selected server from the entire plurality of servers.

The property analysis module 320 ranks 1060 the various properties based on their scores. The property analysis module 320 selects 1070 a subset of the properties based on the rank. For example, the property analysis module 320 may select a subset of properties including the top scoring properties. The selected properties represent the characteristics of the subset of servers that distinguish the subset of the server from the remaining servers. The server analysis module 200 sends the selected subset of properties for presenting to a user, for example, via a user interface such as a dashboard or via an alert.

Figure 11:
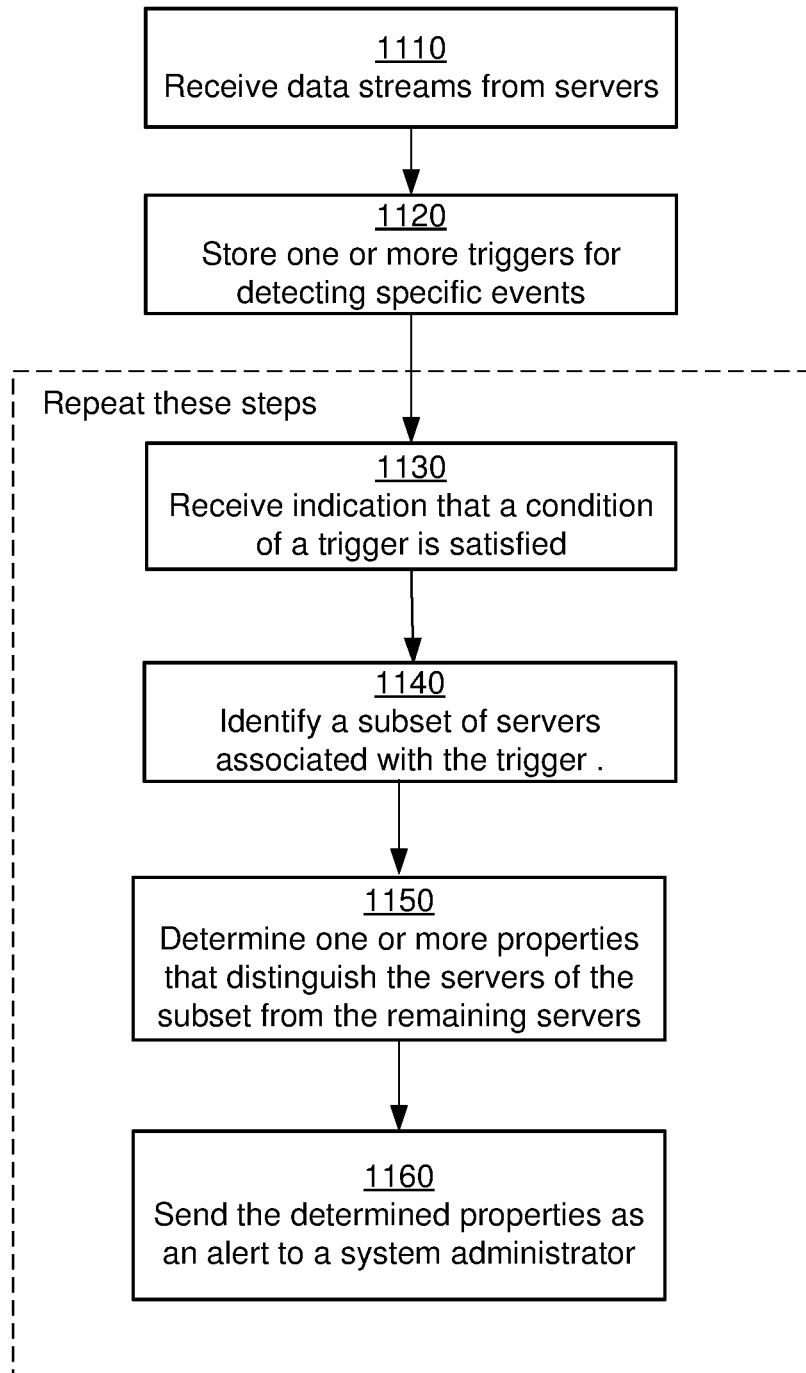
FIG. 11 shows the overall process for detecting events and sending alerts describing properties of servers associated with the events, according to an embodiment.

FIG. 11 shows the overall process for detecting events and sending alerts describing properties of servers associated with the events, according to an embodiment.

The interface module 210 receives 1110 data streams from a plurality of servers. The received data streams represent various types of data generated by instrumented software, for example, data representing resource utilization of a server executing the instrumented software. The trigger manager 330 stores triggers specifying conditions configured to detect specific events associated with servers. For example, a trigger may be configured to detect that a set of servers has excessive resource utilization, for example, server utilization or network utilization.

The trigger manager 330 monitors data streams received from the servers and evaluates the conditions associated with various triggers repeatedly, for example, based on a predetermined schedule. If the trigger manager 330 determines that a condition of a particular trigger is satisfied, the trigger manager 330 invokes the filtering module 310.

The filter module 310 receives 1130 from the trigger manager 330, the condition specified by the trigger that is satisfied. The filter module 310 identifies 1140 a subset of servers sending the data streams associated with the trigger. For example, if the trigger indicates that more than a threshold number of servers have exceeded certain resource utilization, the filter module 310 identifies the subset of servers (or a set of servers) from the plurality of servers that have exceeded the resource utilization.

The property analysis module 320 determines 1150 one or more properties of the servers from the subset of servers that distinguish servers of the subset from remaining servers of the plurality of the servers. Accordingly, the one or more determined properties characterize the subset of servers. The property analysis module 320 provides the determined properties to the alert manager 295. The alert manager 295 sends generates an alert message describing the trigger and the one or more determined properties. The alert manager 295 sends the generated alert to a user, for example, a system administrator. The system administrator may take appropriate action to handle the resource issue. For example, the one or more properties may indicate that the excessive network utilization is in a particular data center. Accordingly, a system administrator may add network resources to the data center to handle the excessive network utilization.

Alternative Embodiments

It is to be understood that the Figures and descriptions of the present invention have been simplified to illustrate elements that are relevant for a clear understanding of the invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for analyzing servers executing instrumented software, comprising:

filtering a set of servers from a plurality of servers based at least in part on a filtering criterion;

identifying properties of the filtered set of servers, each property comprising at least a name value pair having at least a dimension of servers and a value of the dimension, wherein the dimension represents a measurable characteristic of the server;

comparing a likelihood of a server from the filtered set of servers having the property with a likelihood of a server outside the filtered set of servers having the property;

calculating scores for each of the properties based on the comparing and a probability mass function for a selected dimension for the plurality of servers;

ranking the properties of the filtered set of servers based on the scores;

identifying characteristic properties of the filtered set of servers based on the ranking, such that the servers from the filtered set of servers have a higher likelihood of having the characteristic properties than servers outside the filtered set of servers;

and causing display of the ranking of the properties of the filtered set of servers based on the selected dimension through a graphical user interface, wherein the graphical user interface enables selection of one or more dimensions and each of the selected dimensions are graphically represented for the ranking of the properties for the filtered set of servers.

2. The method of claim 1, further comprising:
storing attributes of each of the plurality of servers, each attribute associated with a dimension describing the servers, wherein each attribute value for a server is determined based on one of: data received as a data stream from the server or metadata describing the server specified independent of the data streams; and
receiving a filtering criterion based on an attribute representing resource utilization of servers, the filtering criterion determining whether the attribute representing resource utilization of servers has a value within a specified set of values.

3. The method of claim 2, wherein the identified plurality of properties represents values of attributes based on metadata describing servers, the metadata specified independent of the data streams.

4. The method of claim 2, wherein the resource utilization comprises at least one of CPU utilization, memory utilization, disk utilization, or network utilization.

5. The method of claim 1, wherein the ranking further comprises determining a score for a characteristic property as a function of a first value of the probability mass function and a second value of the probability mass function.

6. The method of claim 5, wherein the score for the characteristic property is a difference of the first value of the probability mass function and the second value of the probability mass function.

7. The method of claim 5, wherein the score for the characteristic property is a ratio of the first value of the probability mass function and the second value of the probability mass function.

8. The method of claim 1, further comprising:
generating an alert describing a characteristic property; and
sending the generated alert to a user account associated with at least one server of the plurality of servers.

9. The method of claim 1, wherein the graphical user interface includes a chart view of the characteristic properties of the filtered set of servers.

10. A system for analyzing servers executing instrumented software, the system comprising:
at least one memory having instructions stored thereon; and
at least one processor configured to execute the instructions, wherein the at least one processor is configured to:
filter a set of servers from a plurality of servers based at least in part on a filtering criterion;
identify properties of the filtered set of servers, each property comprising at least a name value pair having at least a dimension of servers and a value of the dimension, wherein the dimension represents a measurable characteristic of the server;
compare a likelihood of a server from the filtered set of servers having the property with a likelihood of a server outside the filtered set of servers having the property;
calculate scores for each of the properties based on the comparing and a probability mass function for a selected dimension for the plurality of servers;
rank the properties of the filtered set of servers based on the scores;
identify characteristic properties of the filtered set of servers based on the ranking, such that the servers from the filtered set of servers have a higher likelihood of having the characteristic properties than servers outside the filtered set of servers;
and
cause display of the ranking of the properties of the filtered set of servers based on the selected dimension through a graphical user interface, wherein the graphical user interface enables selection of one or more dimensions and each of the selected dimensions are graphically represented for the ranking of the properties for the filtered set of servers.

11. The system of claim 10, further configured to:
store attributes of each of the plurality of servers, each attribute associated with a dimension describing the servers, wherein each attribute value for a server is determined based on one of: data received as a data stream from the server or metadata describing the server specified independent of the data streams; and
receive a filtering criterion based on an attribute representing resource utilization of servers, the filtering criterion determining whether the attribute representing resource utilization of servers has a value within a specified set of values.

12. The system of claim 11, wherein the identified plurality of properties represents values of attributes based on metadata describing servers, the metadata specified independent of the data streams.

13. The system of claim 11, wherein the resource utilization represents one of: CPU utilization, memory utilization, disk utilization, or network utilization.

14. The system of claim 10, wherein the ranking further comprises determining a score for a characteristic property as a function of a first value of the probability mass function and a second value of the probability mass function.

15. The system of claim 14, wherein the score for the characteristic property is a difference of the first value of the probability mass function and the second value of the probability mass function.

16. The system of claim 14, wherein the score for the characteristic property is a ratio of the first value of the probability mass function and the second value of the probability mass function.

17. The system of claim 10, further configured to:
generate an alert describing a characteristic property; and
send the generated alert to a user account associated with at least one server of the plurality of servers.

18. A non-transitory computer-readable storage medium comprising instructions stored thereon, which when executed by one or more processors, cause the one or more processors to perform operations for analyzing servers executing instrumented software, comprising:
filtering a set of servers from a plurality of servers based at least in part on a filtering criterion;
identifying properties of the filtered set of servers, each property comprising at least a name value pair having at least a dimension of servers and a value of the dimension, wherein the dimension represents a measurable characteristic of the server;
comparing a likelihood of a server from the filtered set of servers having the property with a likelihood of a server outside the filtered set of servers having the property;
calculating scores for each of the properties based on the comparing and a probability mass function for a selected dimension for the plurality of servers;
ranking the properties of the filtered set of servers based on the scores;

identifying characteristic properties of the filtered set of servers based on the ranking, such that the servers from the filtered set of servers have a higher likelihood of having the characteristic properties than servers outside the filtered set of servers; and causing display of the ranking of the properties of the filtered set of servers based on the selected dimension through a graphical user interface, wherein the graphical user interface enables selection of one or more dimensions and each of the selected dimensions are graphically represented for the ranking of the properties for the filtered set of servers.

19. The non-transitory computer-readable storage medium of claim 18, further configured for:

generating an alert describing a characteristic property; and sending the generated alert to a user account associated with at least one server of the plurality of servers.

20. The non-transitory computer-readable storage medium of claim 18, further configured for:

storing attributes of each of the plurality of servers, each attribute associated with a dimension describing the servers, wherein each attribute value for a server is determined based on one of: data received as a data stream from the server or metadata describing the server specified independent of the data streams; and receiving a filtering criterion based on an attribute representing resource utilization of servers.

* * * * *